US009013485B2

(12) United States Patent
DiVerdi et al.

(10) Patent No.: US 9,013,485 B2
(45) Date of Patent: Apr. 21, 2015

(54) SYSTEMS AND METHODS FOR SYNTHESIZING HIGH FIDELITY STROKE DATA FOR LOWER DIMENSION INPUT STROKES

(75) Inventors: Stephen J. DiVerdi, Oakland, CA (US); Jingwan Lu, Princeton, NJ (US); Adam Finkelstein, Princeton, NJ (US)

(73) Assignee: Adobe Systems Incorporated, San Jose, CA (US)

( * ) Notice: Subject to any disclaimer, the term of this patent is extended or adjusted under 35 U.S.C. 154(b) by 903 days.

(21) Appl. No.: 13/223,139

(22) Filed: Aug. 31, 2011

(65) Prior Publication Data

US 2013/0120237 A1 May 16, 2013

Related U.S. Application Data

(60) Provisional application No. 61/503,519, filed on Jun. 30, 2011.

(51) Int. Cl.
*G06T 11/20* (2006.01)
*G09G 5/00* (2006.01)

(52) U.S. Cl.
CPC ........................................ *G09G 5/00* (2013.01)

(58) Field of Classification Search
CPC ................................ G06T 11/80; G06T 11/40
USPC .......... 345/156–162, 179, 440; 382/186, 189, 382/202
See application file for complete search history.

(56) References Cited

U.S. PATENT DOCUMENTS 5,730,602 A * 3/1998 Gierhart et al. ............... 434/155
6,801,211 B2 10/2004 Forsline et al.
6,870,550 B1 3/2005 Schuster et al.
6,919,893 B2 7/2005 Tobita et al.
7,817,159 B2 10/2010 Schuster et al.
2002/0130908 A1 9/2002 Wilensky
2007/0216684 A1 9/2007 Hsu
2011/0181618 A1 7/2011 DiVerdi et al.
2011/0206277 A1 8/2011 Matsumoto

OTHER PUBLICATIONS

Shuto et al. "A Handwritten Character Training System with Haptization of Instructor's Brush-Strokes"; Department of Computer Science and Intelligent Systems, Oita University, Japan; IEEE, 2009, pp. 1030-1034.*

(Continued)

*Primary Examiner* — Maurice L McDowell, Jr.
(74) *Attorney, Agent, or Firm* — Wolfe-SBMC

(57) ABSTRACT

Systems and methods for synthesizing paintbrush strokes may use high fidelity pose data of reference strokes to supplement lower dimension stroke data. For example, 6DOF data representing reference strokes created by skilled artists may be captured and stored in a library of reference strokes. A query stroke made by a less skilled artist/user and/or made using input devices that do not provide 6DOF data may be processed by a stroke synthesis engine to produce an output stroke that follows the trajectory of the query stroke and includes pose data from one or more reference strokes. The stroke synthesis engine may construct feature vectors for samples of reference strokes and query strokes, select the best neighbor feature vector from the library for each query stroke sample, assign the pose data of the best neighbor to the query sample, and smooth the sequence of assigned poses to produce the synthesized output stroke.

20 Claims, 13 Drawing Sheets

(56) References Cited

OTHER PUBLICATIONS

Stephen DiVerdi, et al., "Industrial-strength painting with a virtual bristle brush," In Symposium on Virtual Reality Software and Technology, 2010, pp. 1-8.

Marius Muja, et al., "Fast approximate nearest neighbors with automatic algorithm configuration," In International Conference on Computer Vision Theory and Applications, 2009, pp. 1-10.

Co-pending U.S. Appl. No. 12/832,960, filed Jul. 8, 2010, Harris et al.

* cited by examiner

How quickly daft jumping zebras vex two driven jocks help fax my big quiz the five boxing wizards jump quickly pack my box
FIG. 11A
how to waltz
FIG. 11B
how to waltz
FIG. 11C
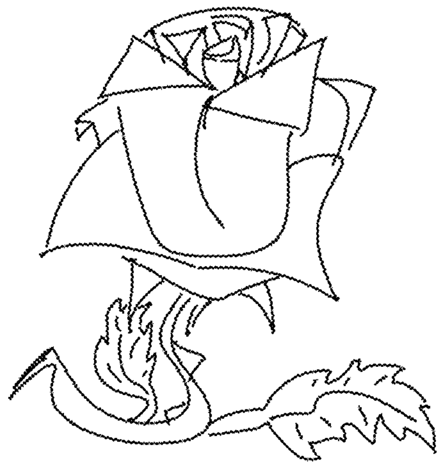
FIG. 11D
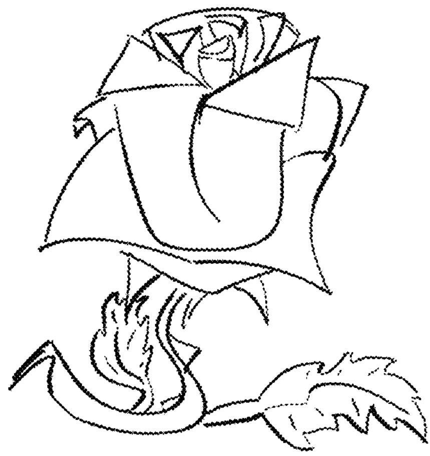
FIG. 11E

SYSTEMS AND METHODS FOR SYNTHESIZING HIGH FIDELITY STROKE DATA FOR LOWER DIMENSION INPUT STROKES

PRIORITY INFORMATION

This application claims benefit of priority of U.S. Provisional Application Ser. No. 61/503,519 entitled "Systems and Methods for Synthesizing High Fidelity Stroke Data for Lower Dimension Input Strokes" filed Jun. 30, 2011, the content of which is incorporated by reference herein in its entirety.

BACKGROUND

Description of the Related Art

Sketching or drawing on paper is a natural way to create and envision shapes. A goal of computer-based sketching systems is to leverage this ability in order to create models of real or imaginary objects (including 3D objects or stylized 2D objects) on the computer (e.g., using shading and other stylistic effects). However, there are several challenges inherent in this process. For example, humans (unlike computers) have an extraordinary ability to interpret even very loosely sketched drawings as valid 3D or stylized 2D objects, and are comfortable with ambiguities in those drawings. Typical sketching applications (such as those available on a tablet device) create only simple 2D input, which may then need to be interpreted as 3D or stylized 2D data in some way. It can be difficult for a computer to perform this interpretation in a manner that is pleasing to people. For example, even when drawings are not precise (or even correct), a person may nevertheless have a strong expectation of how they should be interpreted and/or how the person would prefer that they appear.

Many existing applications on tablet (or slate) devices use data in only two degrees of freedom (i.e. 2DOF input) for stroke generation. Other applications include data representing velocity or pressure as an additional degree of freedom. Some existing applications allow users to define stroke effects by selecting a set of static parameters for a stroke (e.g., to set pose data for the stroke as if the user is holding a brush using a particular pose and/or with a static amount of pressure). Some applications that include paintbrush simulation technology (e.g., Adobe® Photoshop® software from Adobe Systems, Inc.) assume a static vertical brush pose with average pressure when only 2DOF input is available, which can create strokes that look artificially stilted. Other applications that include paintbrush simulation technology (e.g., Adobe® Illustrator® software from Adobe Systems, Inc.) simulate the use of a paintbrush and the behavior of a brush stroke as the stroke is drawn. When only 2DOF input is available, the Illustrator software computes a dynamic six degree of freedom (6DOF) pose based on heuristics about how an artist typically holds a brush relative to a stroke (e.g., tilted at 45 degrees and oriented tangent to the stroke, with a constant pressure). This approach can create strokes having a less stilted appearance than those created by the Photoshop software, but it still has many shortcomings for different types of strokes, and is ultimately less expressive than real 6DOF input.

SUMMARY

Systems and methods for synthesizing paintbrush strokes may use high fidelity pose data of reference strokes to supplement lower dimension stroke data. For example, the systems and methods described herein may be used to create a sequence of synthesized poses that follows the trajectory of an input stroke (or query stroke) dependent, at least in part, on a library of collected reference strokes, and to output data representing the sequence of synthesized poses. The library may include 6DOF data pre-recorded (or otherwise captured) during the creation of a variety of reference strokes by skilled artists. In some embodiments, the input stroke data may be compared to data in the library to find the best matches for respective portions of the input stroke (e.g., piece by piece). In some embodiments, the data representing the input (query) stroke may include data for fewer degrees of freedom than the data representing the reference strokes, and/or fewer degrees of freedom than the data representing the sequence of synthesized poses (i.e. the output stroke). For example, the reference strokes and/or the output stroke may include full 6DOF data, while the input stroke may include between two and five DOF data.

In some embodiments, a stroke synthesis engine (which may be a component of an image editing application) may receive data representing a query stroke. The data representing the query stroke may include trajectory data, i.e. data that indicates the trajectory of the query stroke with respect to two degrees of freedom (e.g., x, y data in the plane of the stroke). In some embodiments, the data representing the query stroke may also include pose data (e.g., data in additional degrees of freedom). In various embodiments, a query stroke made by a less skilled artist/user and/or made using input devices that do not provide 6DOF data may be processed by such a stroke synthesis engine to produce an output stroke that includes 6DOF data.

In response to receiving data representing a query stroke, a stroke synthesis engine may access data representing one or more reference strokes. In some embodiments, the data representing each of the reference strokes may include both trajectory data (e.g., data indicating a trajectory of the reference stroke within the plane of the reference stroke) and pose data (e.g., data corresponding to one or more other degrees of freedom, such as tilt, twist, or pressure data). In some embodiments, the reference strokes may have been created by one or more skilled artists using advanced input devices. In various embodiments, the collected reference stroke data may be stored in one or more libraries (or databases), grouped by style, content, artist, and/or other criteria.

In some embodiments, synthesizing an output stroke may include constructing feature vectors for samples of the reference strokes and for samples of the query stroke being processed. The feature vector for each of the stroke samples may include trajectory data components that are dependent on trajectory data for one or more neighboring samples of the stroke. In some embodiments, the feature vector for a query stroke or a reference stroke may also include pose data components that are dependent on pose data for one or more neighboring samples. Note that feature vectors may be constructed for reference strokes when the reference strokes are created or added to a reference stroke library, or at any time after the reference strokes have been created or added to the library, including in response to the receipt of a query stroke. Feature vectors may be constructed for query strokes when the query strokes are created, or in response to the invocation of a stroke synthesis operation on existing query stroke data, in different embodiments.

In some embodiments, for each of the feature vectors of a query stroke, a set of nearest neighbor features (i.e. a collection of the most closely matching feature vectors) may be identified from the library of reference strokes by comparing the feature vector for each of the samples of the query stroke to the feature vectors for a plurality of samples of one or more reference strokes. In other words, the collection of nearest neighbor feature vectors for each sample of the query stroke may include the two or more feature vectors for respective samples of one or more reference strokes that are most similar to the feature vector constructed for the sample of the query stroke.

In some embodiments, a best neighbor feature vector may be identified for each of the samples of the query stroke by selecting one of the nearest neighbor feature vectors from each of the collections of nearest neighbor feature vectors. In some embodiments, selecting the best neighbor feature vectors from each of the collections of nearest neighbor feature vectors includes applying dynamic programming to the collections of nearest neighbor feature vectors to determine the lowest cost sequence of nearest neighbor feature vectors. In some embodiments, selecting the best neighbor feature vectors from each of the collections of nearest neighbor feature vectors may include applying a weighting to the nearest neighbor feature vectors that encourages the selection, for adjacent samples of the query stroke, of nearest neighbor feature vectors for adjacent samples of the same reference stroke. The best neighbor feature vector for each of the samples of the query stroke may include pose data (or aggregated pose data) for a corresponding sample of one of the one or more reference strokes.

In some embodiments, once the best neighbor feature has been identified for a given sample of the query stroke, the pose data of the best neighbor feature may be assigned as the pose data for the given sample of the query stroke, and may be included in the sequence of poses in the synthesized output stroke. In some embodiments, the sequence of poses from the best neighbor features may be smoothed using a blending technique. For example, a smoothing operation may be performed to blend the pose data assigned to one or more pairs of adjacent query samples to produce a smoothed version of the synthesized output stroke. In some embodiments, 6DOF data representing a synthesized stroke that follows the original x, y trajectory of the input query stroke and includes the smoothed sequence of poses may be output by the stroke synthesis engine. For example, it may be stored for later use and/or displayed by the system, in different embodiments.

BRIEF DESCRIPTION OF THE DRAWINGS

FIGS. 11A-11E illustrate various reference strokes, query strokes, and output strokes, according to one embodiment.

Figure 1:
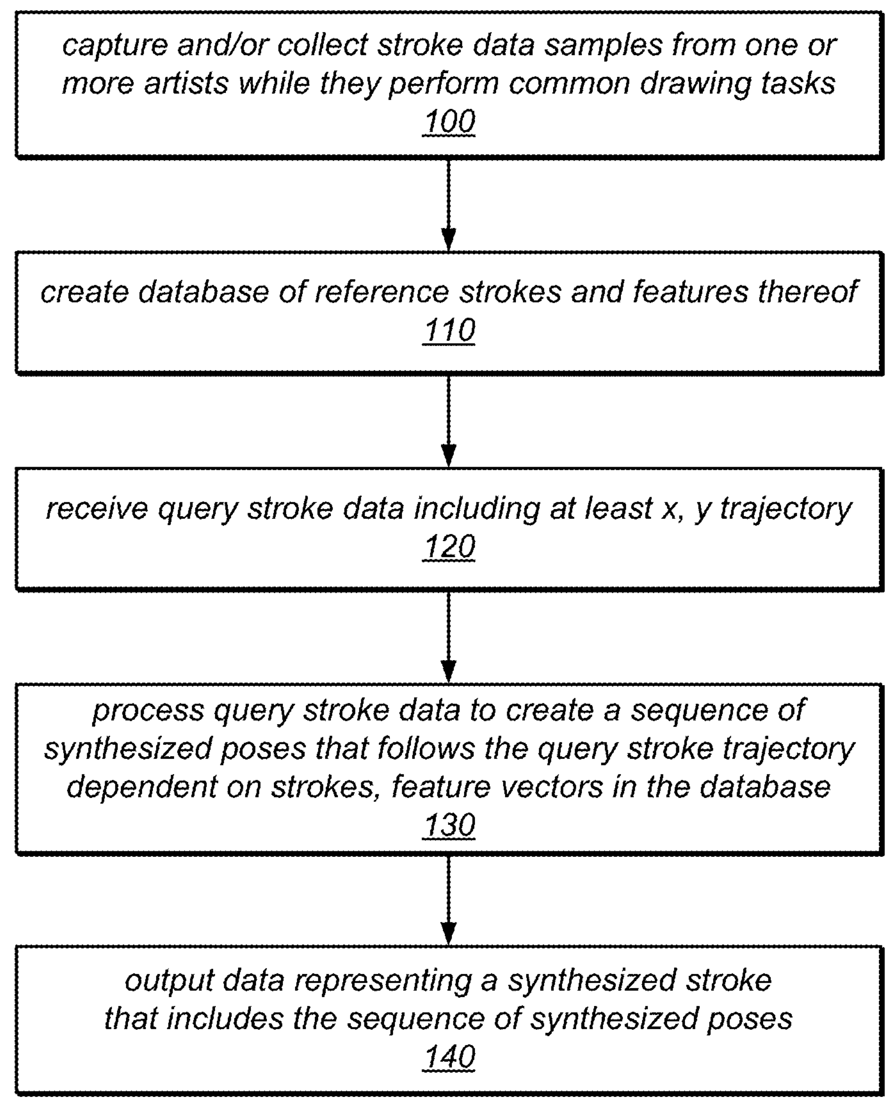
FIG. 1 is a flow diagram illustrating one embodiment of a method for synthesizing high fidelity stroke data for lower dimension input strokes.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software.

Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The appearance of real paintbrush strokes may depend heavily on subtle nuances in how the artist holds and manipulates the paintbrush during the stroke. Correspondingly, paintbrush simulation technologies may take maximal advantage of available hardware to create a similarly complex set of brush behaviors based on subtle changes in user input. For example, slight twists of a paintbrush during a stroke may be used to add texture and depth. For simulations to be able to reproduce these results, high fidelity input devices such as advanced tablet and/or stylus devices (e.g., an advanced art pen type device) may be used, and these advanced devices may provide six degree of freedom (6DOF) data that can be used to fully reconstruct the virtual brush's pose.

However, there may be many instances in which 6DOF input data, and/or the advanced hardware needed to capture such data, may not be available. For example, many potential users of an image editing application (e.g., a painting application) do not have a tablet device, or may have a lower end model. These users may only be able to provide stroke data in 2DOF (e.g., using a mouse, touchpad, trackpad, tablet, or other device that provides x, y trajectory data only), 3DOF (e.g., using a tablet that provides both x, y trajectory data and pressure data), or 5DOF (e.g., using a tablet that does not include an art pen, but that provides x, y, pressure, tilt-x, and tilt-y data). Similarly, many new classes of devices, such as phones and slates, may support only the most rudimentary input technology and thus are frequently only able to provide 2DOF stroke data. In another example, a user may have created vector line art (using, e.g., a program such as the Illustrator program), which consists of a set of 2D paths, and may wish to apply an expressive stroke style to that vector art. In yet another example, a novice user may have access to any of a variety of available input devices (including advanced hardware capable of generating high fidelity stroke data), but may not be able to manipulate them as expertly as a trained artist or to effectively use them to create nicely styled strokes. Similarly, a user of any ability skill level may want to apply an alternate style to their strokes, i.e. one that differs from the style of the input stroke data they provided. In other words, they may wish to "paint with someone else's hands".

The techniques described herein may in some embodiments be used to synthesize high quality stroke data (e.g., data in more than two or three degrees of freedom) from lower quality input data, and the high quality output strokes may in turn be used to drive a paintbrush simulation or other advanced image editing application. In various embodiments, the lower quality input data may be captured using a two degree of freedom (2DOF) mouse, a finger on a touch pad, or another low quality input mechanism, may include a path captured from vector art and/or may include any type of stroke input (e.g., input representing a paint brush stroke) generated by a novice user of various simple or advanced input devices.

In various embodiments, the techniques described herein may utilize a database or other repository of high fidelity stroke data recorded (or otherwise captured) when strokes are created by expert artists to synthesize high quality output strokes from the lower quality input data (sometimes referred to herein as "query stroke data" or simply a "query stroke"). For example, the systems described herein may utilize a working repository of reference data created by one or more expert artists (e.g., data that was collected from artists of varying skill levels and that represents various artistic styles) as input data. This input data may include a collection of stroke data created during the performance of proscribed drawing tasks, including writing English script and making simple line drawings. Artists creating such reference data may be told what to draw (e.g., with example images), and/or may be told what brush settings to use (if entering stroke data using an application that simulates the behavior of different paintbrushes through various brush tools and brush tool settings, such as the Photoshop application). In some embodiments, the movements of the artists' hands and/or brush tools may be recorded (or otherwise captured) while creating the reference stroke data. In some embodiments, artists may submit data files of their compositions that contain data organized as a set of strokes, where each stroke is a set of input samples that include data in all available degrees of freedom.

Various embodiments of methods and apparatus for synthesizing high fidelity stroke data for lower dimension input strokes are described in detail below. In some embodiments, systems and methods for synthesizing paintbrush strokes may use the high fidelity pose data of various reference strokes (or samples and portions thereof) to supplement lower dimension query stroke data. As noted above, 6DOF data representing reference strokes created by skilled artists using advanced tablets and/or stylus devices may be captured and stored in a library of reference strokes. In some embodiments, the systems described herein may read in a collection of reference stroke files to create a database or repository of expert artists' strokes. In some embodiments, such a database or repository (sometime referred to herein as a "reference stroke library" or "reference curve library") may be examined to find features that are similar to (i.e. nearest matches to) lower quality user input. As used herein, the terms "reference stroke", "library stroke", "reference curve" and "library curve" may be used somewhat interchangeably.

In some embodiments, a query stroke made by a less skilled artist/user and/or made using input devices that do not provide 6DOF data may be processed by a stroke synthesis engine to produce a high quality synthesized stroke that follows the trajectory of the query stroke. For example, the stoke synthesis engine may read in files referred to as "queries" that contain stroke data for which poses are to be synthesized, or may receive stroke data directly (e.g., through a user interface of the stroke synthesis engine or an image editing application of which a stroke synthesis engine is a component). The system may process the query stroke data to create a sequence of synthesized poses. In some embodiments, the stroke synthesis engine may construct feature vectors (sometimes referred to herein simply as "features") from samples of reference strokes and the query stroke, may select the best neighbor feature from a set of nearest neighbor features in the reference stroke library for each query feature based on a lowest cost path through a graph of nearest neighbors, and may smooth the sequence of selected features to produce the synthesized stroke. The stroke synthesis engine may then write out a new data file that represents a synthesized output stroke that has the same x, y trajectories as the query stroke, but that also includes these synthesized poses.

Various examples of systems and methods for synthesizing high quality strokes from lower quality input strokes may include one or more of the following terms:

- trajectory (or trajectory data), a sequence of 2DOF x, y position values.
- pose (or pose data), 4DOF values that may be synthesized (pressure, tilt-x, tilt-y, and twist).
- library (or reference library), a collection of artist strokes that may have been collected offline.
- query (or query stroke), an input stroke to which the stroke synthesis techniques described herein may be applied.
- output (or output stroke), a high quality stroke that has the same trajectory as the query, but that includes poses created based on data in the library.

FIG. 1 is a flow diagram illustrating one embodiment of a method for synthesizing high fidelity stroke data given lower dimension input strokes. As illustrated at 100 in this example, the method may include capturing and/or collecting stroke data samples from one or more artists while they perform common drawing tasks. For example, in some embodiments, data may be captured for reference strokes using an advanced tablet system and/or an advanced input stylus that together are able to provide 6DOF stroke data, as described herein. In this example, the method may include creating a database of reference strokes and/or corresponding features (as defined by corresponding feature vectors) of those reference strokes, as in 110. In some embodiments, reference strokes may be captured, collected, and/or categorized according to the artists who created the reference strokes, the style or content of the reference strokes (or the images from which they are taken), or various other criteria.

The method may also include receiving query stroke data as input data to be processed and for which a synthesized stroke is to be generated, as in 120. This input data may include at least x, y trajectory information for the query stroke (i.e. data representing the path that the query stroke takes in the x and y dimensions). However, as described herein, this query stroke data may be lower dimension data than the stroke data that is provided for reference strokes in the library/database. For example, the query stroke data may be obtained using less advanced tools than those used to provide the reference stroke data (e.g., less advanced tablets, styluses, or cursor control devices that are not able to provide as much information as the input devices used to provide the reference stroke data). In another example, the query stroke data may be input using advanced input devices, but by less skilled artists than those who have provided the reference stroke data. In other words, in some cases, 6DOF data provided for a query stroke may not contain the amount, type, and/or quality of information that may be needed to create a high quality output stroke for display.

As illustrated in this example, the method may include processing the query stroke data to create a sequence of synthesized poses that follows the trajectory of the query stroke dependent on reference stroke data found in the database (e.g., dependent on various feature vectors of the stroke data for one or more reference strokes), as in 130. In some embodiments, this synthesis may be performed by a stroke synthesis engine executing on a computer system, and that synthesis engine may implement any or all of the techniques described herein for capturing reference stroke information, receiving a query stroke, constructing feature vectors, finding nearest neighbor sets, selecting the best neighbors from those nearest neighbor sets (e.g., using dynamic programming), and/or smoothing the resulting sequence of poses to create a synthesized output stroke. The method may then include outputting data representing a resulting synthesized stroke (i.e. an output stroke that includes the sequence of synthesized poses), as in 140. For example, the data may be displayed to a user (e.g., a user who entered the input query stroke or selected the input query stroke for display) as an output stroke (either individually or as part of a larger image) and/or may be stored (either individually or as part of a larger image) for later use or display, in different embodiments.

As noted above, the pose of a real paintbrush during a stroke has 6DOF: x and y position (in the plane of the canvas), z position (the height of the brush above the canvas), tilt-x and tilt-y (the orientation of the brush off vertical), and twist (about the brush axis). Various combinations of tablet devices and/or stylus devices may be used to provide this same information, in some embodiments. In some embodiments, an advanced tablet used with an advanced stylus (such as those illustrated in FIGS. 2A and 2B and described below) may provide input data in six dimensions (i.e. 6DOF data) to represent a paintbrush stroke. For example, they may provide data representing the position of the tip of the stylus on the tablet in the x and y dimensions, the pressure on the stylus, the tilt of the stylus in the x dimension (tilt-x), the tilt of the stylus in the y dimension (tilt-y), and the twist of the stylus. In such embodiments, by mapping pressure to z position within some range, the full pose of the tablet stylus may be mapped to the full pose of a virtual brush when creating strokes via a brush simulation engine. In some such embodiments, because of the physical simulation aspect of the brush simulation, the output mark may respond to changes in any aspect of the pose. Therefore, the best results may be achieved when all these 6DOF of data are available.

Figure 2A:
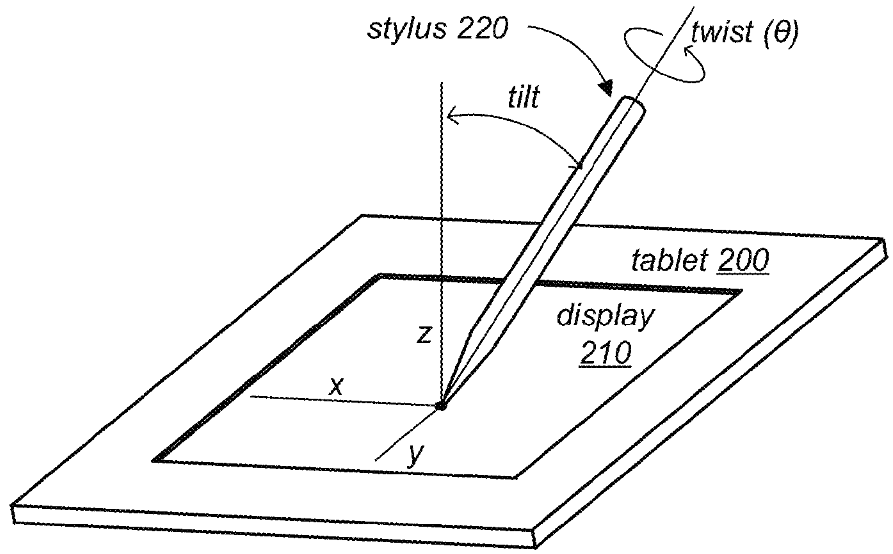
FIG. 2A illustrates an isometric view of the use of a tablet device, according to one embodiment.
Figure 2B:
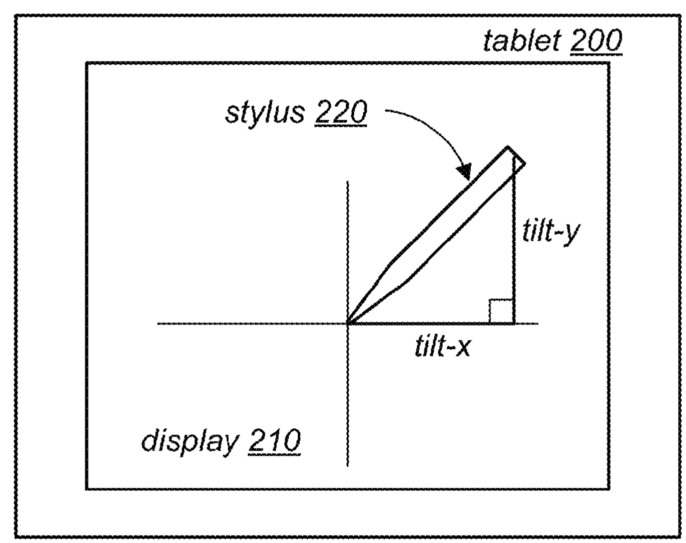
FIG. 2B illustrates a top view of the use of a tablet device, according to one embodiment.

FIG. 2A illustrates an isometric view of the use of a tablet device 200, according to one embodiment. In this example, the tablet device includes a display portion 210. FIG. 2A illustrates the use of a 6DOF stylus (220) to enter data by drawing various strokes using tablet 200. In this example, stylus 220 can provide data corresponding to x and y coordinates, pressure (shown as z), tilt (in two dimensions) and twist (A), as strokes are drawn in the display portion 210 of tablet 200. FIG. 2B illustrates a top view of the use of tablet device 200, according to one embodiment. Again, tablet 200 includes a display portion 210 and data can be input using a 6DOF stylus 220. In this example, the two tilt dimensions (tilt-x and tilt-y) are illustrated.

In some embodiments, once a library database of strokes has been acquired and an input query trajectory is available, a stroke synthesis engine (or another component of the systems described herein) may perform the following operations to generate a synthesized output stroke:

1. Construct feature vectors based on library samples and query samples.
2. For each query feature, find the nearest neighbor library features.
3. Given a set of nearest neighbor library features for a query feature, choose the best one.
4. Smooth the poses of the sequence of best neighbor features.
5. Write out a synthesized output stroke that has the same trajectory as the query and includes the selected and/or smoothed pose data.

Figure 3:
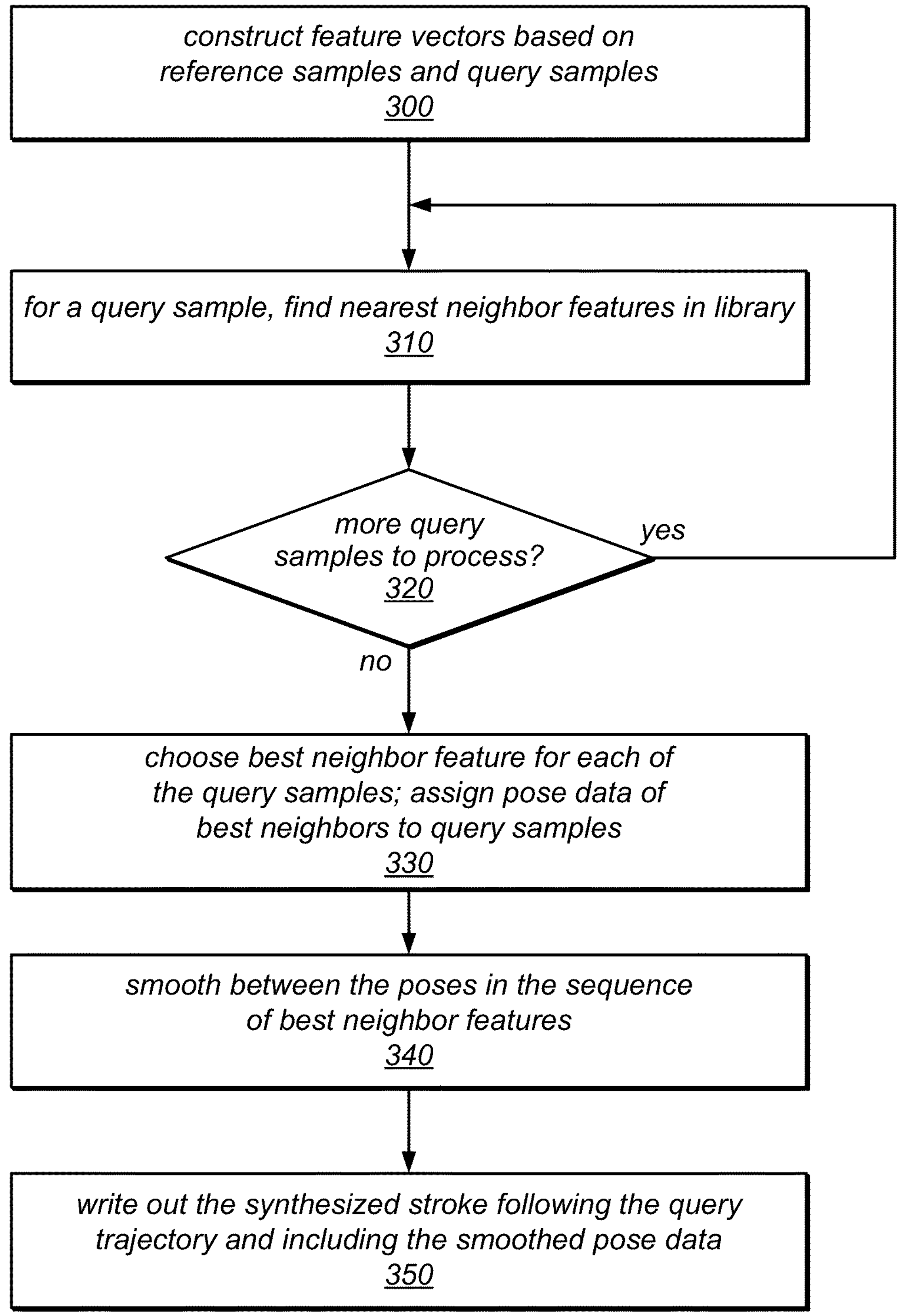
FIG. 3 is a flow diagram illustrating one embodiment of a method for processing reference stroke data and query stroke data to produce a synthesizing output stroke.

One embodiment of a method for processing reference stroke data and query stroke data to produce a synthesized output stroke is illustrated by the flow diagram in FIG. 3. As illustrated at 300, in this example, the method may include constructing feature vectors for corresponding reference samples and query samples. These feature vectors, which are described in more detail below, may sometimes be referred to herein merely as "features". For a given query sample (e.g., a given point within a query stroke), the method may include finding the nearest neighbor features in a library of reference strokes (e.g., feature vectors with similar values), as in 310, and repeating this determination for each of the other query samples of the query stroke (shown as the feedback from 320 to 310). As illustrated in this example, the method may include choosing the best neighbor feature for each of the query samples, as in 330, and assigning the pose data (e.g., values for any DOFs other than the x, y position values, including pressure, tilt, and/or twist components) of the best neighbor feature to the corresponding query sample. As described in more detail below, in some embodiments, a dynamic programming technique may be applied to sets of nearest neighbor features to determine the best neighbor for each of the query samples. Once the sequence of best neighbor features has been determined and the pose data of those features has been assigned to the corresponding query samples, the method may include smoothing between the poses of the sequence of best neighbor features (which may generate modified pose data), as in 340, and writing out the resulting synthesized stroke. As noted above, the synthesized stroke may follow the trajectory of the query stroke, and may include the pose data of the best neighbor features and/or any modified pose data generated by smoothing between the poses, as in 350.

In some embodiments, the data captured for an individual sample in a library stroke or a query stroke represents an instantaneous pose. In some embodiments, the synthesis operations described herein may be applied to small patches of stroke data, rather then on the data captured for these instantaneous samples. In such embodiments, the system may construct higher dimensional feature vectors based on sequences of stroke sample data that encapsulate the stroke data (e.g., the stroke trajectory) over a short window of time. For example, for a stroke S and n samples of that stroke ($s_i$): $S=\{s_i|0\leq i<n\}$ where $s_i=\langle x,y,p,tx,ty,\theta\rangle$, a set of features may be generated, $$F(S)=\{f_i|0\leq i<n\}.$$

In this example, each $f_i$ is a vector of x, y values from m=a+b+1 consecutive samples, $$f_i=\langle s_{i-a}^x,s_{i-a}^y,\ldots,s_{i+b}^x,s_{i+b}^x\rangle.$$

In this example, when constructing a particular feature vector $f_i$, a may represent the number of previous (history) samples of the query stroke (samples between $s_0$ and $s_i$), and b may represent the number of following (future) samples of the query stroke (samples between $s_i$ and $s_n$). Therefore, if m=10, F is a 20 element vector (e.g., containing x, y values for each of 10 samples).

To address issues of sampling, and to weight sample importance based on time, instead of the feature vector F containing samples $s_i$ directly, the system may in some embodiments use F', which may be generated by applying a number of taps (e.g., triangle filters) to the raw sample data, as follows:

$$F'(S)=\{f_i'|0\leq i<n\}, \text{ where}$$

$$f_i'=\langle t_{i-a}^x,t_{i-a}^y,\ldots,t_{i+b}^x,t_{i+b}^y\rangle \text{ and}$$

$$t_i=\Sigma_{j=-c}^{c}w_js_{i+j}.$$

In some embodiments, this approach may reduce aliasing effects by combining multiple nearby samples into each feature tap, and may provide importance weighting by increasing the length of the taps (that is, increasing c) for the taps applied to samples that are farther from the target sample $s_i$.

Figure 4A:
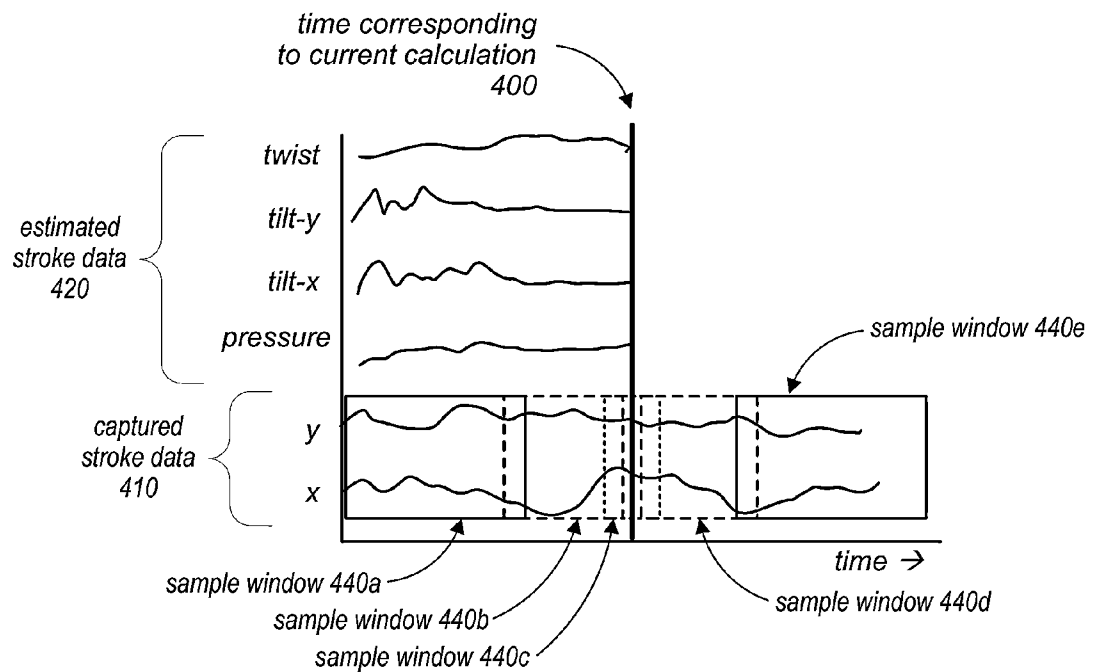
FIG. 4A illustrates the use of captured and/or estimated stroke data to construct feature vectors at sample points of a query stroke, according to one embodiment.
Figure 4B:
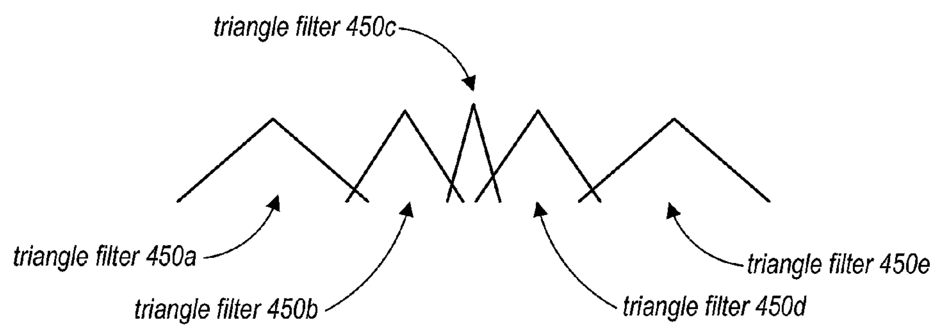
FIG. 4B illustrates a collection of triangle filters that may be used in constructing feature vectors for sample points of a query stroke, according to one embodiment.

FIGS. 4A-4B illustrate the use of captured and estimated stroke data to construct feature vectors for a sample of a query stroke, according to one embodiment. More specifically, FIG. 4A illustrates the use of captured (and, in some cases, estimated) stroke data to construct a feature vector at a sample point of a query stroke, and FIG. 4B illustrates a collection of triangle filters that may be used in constructing a feature vector at a sample point of a query stroke, according to one embodiment. In this example, a feature vector is being constructed for a query stroke sample taken at time 400. In this example, it is assumed that 2DOF stroke data (which is shown in FIG. 4 as captured stroke data 410, and which includes an x component and a y component of the query stroke) is captured for the query stroke over a particular period of time (which includes time 400). Note that in some embodiments, query stroke data may be captured for an entire stroke before any feature vector generation is performed, while in other embodiments, feature vectors may be generated for individual samples and/or portions of a query stroke before the stroke data for the entire stroke is available. The captured data may represent the trajectory (or path) of the query stroke in the x, y plane. As described above, a feature vector for a query sample may be constructed based on the captured and/or estimated stroke data for multiple overlapping sample windows 440 on either side of the query sample currently point being processed. In other words, the construction of a feature vector for a given sample (or various calculations thereof) may lag the receipt of the query stroke data in time so that stroke data obtained from one or more "future" samples may be included in the calculation. FIG. 4A illustrates an example in which five sample windows, labeled as sample windows 440*a*-440*e*, are used in constructing a feature vector for the query stroke sample at time 400.

In some embodiments, the stroke data values (e.g., 2DOF or 6DOF data values) captured and/or estimated in different samples over the width of each sample window may be averaged to determine the contribution from that sample window to the feature vector for the current query sample. In the example illustrated in FIG. 4A, the x values for each of the sample points in sample window 440*a* may be averaged to contribute one of the values in the feature vector for the current query sample point. The y values for each of the sample points in sample window 440*a* may be averaged to contribute another one of the values in the feature vector for the current query sample point. Similarly, the averages of the x values and the averages of the y values in each of the other sample windows (440*b*-440*e*) may each contribute another value to the feature vector for the current query sample. In this example, only 2DOF data is used to construct the feature vector for the current query sample. Therefore, the feature vector includes the ten values corresponding to the x and y value averages in each of the five sample windows. Note that in other embodiments, different numbers of sample windows may be processed to determine a feature vector for a given query sample. In some embodiments, data in more dimensions (e.g., up to 6DOF) may be processed (e.g., averaged or otherwise filtered) in each sample window, and the feature vector for the query sample may include a corresponding number of additional component values.

In some embodiments, the sample window that includes the query sample currently being processed (e.g., the query sample taken at time 400, in this example) may be the smallest sample window, and the stroke data for each individual sample in that window may have a large influence over the stroke data values included in the resulting feature vector. In some embodiments, the sample windows that are farther from the current query sample in time (either before or after time 400) may be wider than the sample window that include the query sample currently being processed. In some such embodiments, the stroke data for each of the individual samples in these windows may have less influence over the stroke data values included in the resulting feature vector than the stroke data generated from the smallest/nearest sample window. As noted above, different weighting may be applied to the sample data obtained from different ones of the sample windows 440, in some embodiments.

In some embodiments, rather than applying averaging or weighted averaging to the raw sample data obtained in each sample window, the sample data obtained from different ones of the sample windows 440 may be filtered using different and/or more complex filters. For example, in some embodiments the sample data obtained from different ones of the sample windows 440 may be filtered using different ones of a collection of triangle filters 450*a*-450*e*, as illustrated in FIG. 4B. In this example, the sample data obtained from sample window 440*a* may be filtered using triangle filter 450*a*, the sample data obtained from sample window 440*b* may be filtered using triangle filter 450*b*, and so on. Note that in this example, the triangle filters are applied in overlapping time periods such that as time moves forward, the contribution to the x and y components of the feature vector from a single sample decreases in one sample window and increases in the next sample window. Here again, five sample windows are used in constructing a feature vector for the current query sample. Therefore, the resulting feature vector for each query sample may include ten values: an x component and a y component from each of the five sample windows 440 calculated by the application of the corresponding triangle filter 450. In other words, the ten values of the feature vector may represent a weighted local trajectory around the time of the given sample point.

As briefly noted above, in some embodiments, pose data (e.g., stroke data for four additional degrees of freedom: twist, tilt-y, tilt-x, and pressure) may be estimated for previously processed query samples taken prior to the query sample currently being processed, and may be estimated for the current query sample, once processing is complete. This is illustrated in FIG. 4 as estimated stroke data 420. Embodiments in which such estimated stroke data is employed are described in more detail below.

Note that similar techniques may be applied to the generation of feature vectors corresponding to reference stroke samples. For example, in embodiments in which feature vectors are constructed for reference strokes based on data in five overlapping sample windows, each feature vector (which corresponds to a respective reference stroke sample point) may include up to 30 component values, i.e. one component value for each of the six degrees of freedom for which data is available (x, y, pressure, tilt-x, tilt-y, and twist) from each of the five sample windows.

In different embodiments, a variety of mechanisms (including some existing algorithms) may be employed in a nearest neighbor searching operation. For example, various search algorithms may be applied in high dimensional space with an L2 norm (i.e. a vector norm) to find the reference library feature vectors (which may also be referred to as library features) that most closely resemble the feature vectors constructed for the samples of a query stroke. In some such embodiments, the set of library features may be entered into a data structure to facilitate a nearest neighbor search, and each query feature may be used to find the k nearest neighbors in the data structure. In this example, k may be a pre-determined value representing the number of nearest neighbors to be identified, and may be a default value or may be configurable by the user. In this example, for a query stroke Q, for each sample $q_i$ the result of the nearest neighbor search may be a corresponding set of k neighbors, $n_0^i, \ldots, n_{k-1}^i$.

Figure 5:
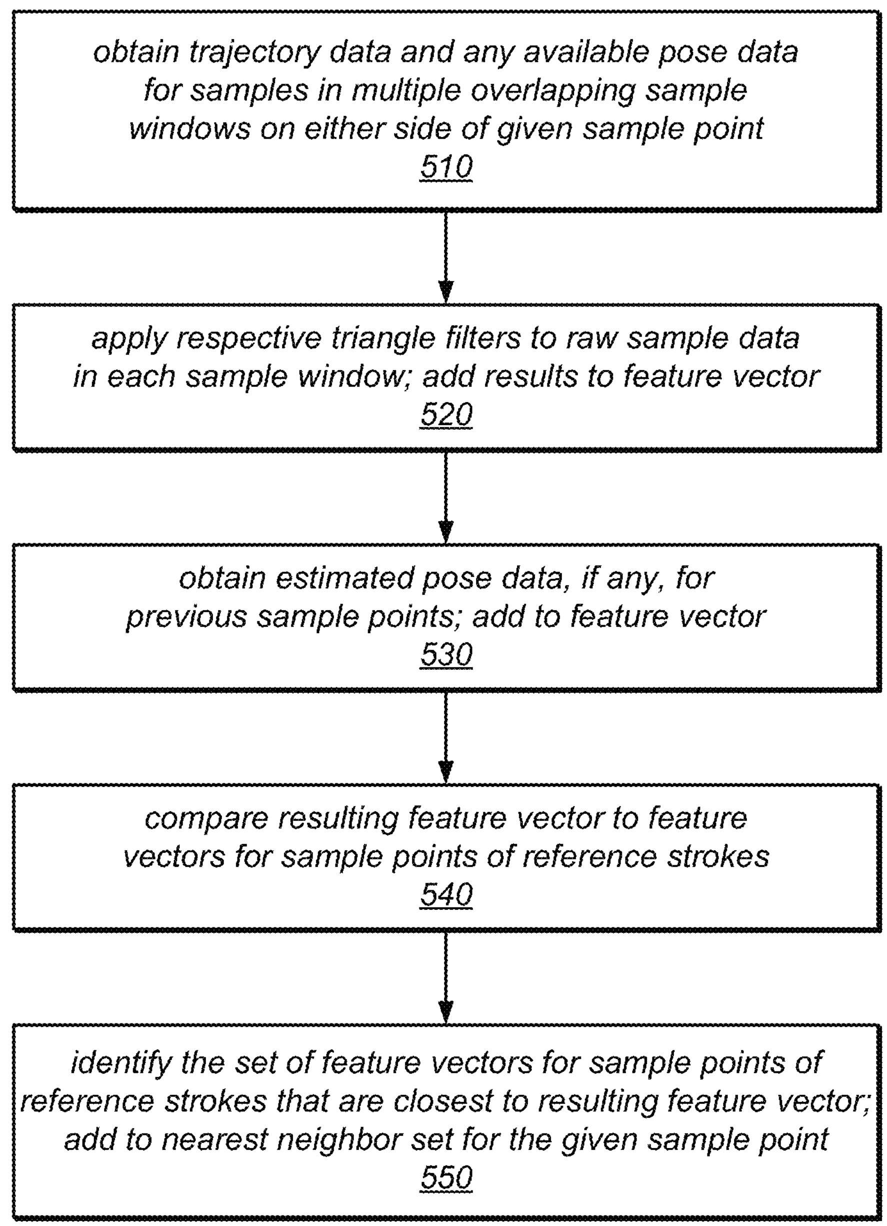
FIG. 5 is a flow diagram illustrating one embodiment of a method for constructing feature vectors for a query stroke and for identifying sets of neighbor features.

One embodiment of a method for constructing feature vectors for a query stroke and for identifying sets of neighbor feature vectors (sometimes referred to as neighbor features) is illustrated by the flow diagram in FIG. 5. As illustrated at 510, the method may include obtaining trajectory data (e.g., raw values of x and y components of the stroke data) and any available pose data (e.g., raw values for tilt, twist, or pressure) for sample points of the query stroke in overlapping sample windows on either side of a given sample point. For example, the method may include obtaining trajectory and pose data captured at and/or associated with the given sample point, trajectory and pose data captured at and/or associated with a pre-determined number of previous sample points (in a pre-determined number of sample windows), and trajectory and pose data captured at and/or associated with a pre-determined number of subsequent sample points (in a pre-determined number of sample windows), in some embodiments. As noted above, the sample windows may be of different widths and the influence of the data obtained in different ones of the sample windows may be weighted differently (e.g., according to the proximity of the sample window to the given sample point).

In some embodiments, the method may include applying a respective triangle filter to the raw data for each component of the stroke data from each of the sample windows, and adding the results to the feature vector for the given sample point, as in 520. Note that in other embodiments, the raw data obtained from a collection of sample points (e.g., some number of sample points prior to and subsequent to the given sample point) may be included in the feature vector, or the sample data may be averaged, pre-processed using other types of filters, or aggregated using other methods to generate component values for the feature vector. As described above, the resulting feature vector may include an x component value and a y component value from each of the sample windows, and may also include pose component values from each of the sample windows (if any pose data is provided for the input query stroke). For example, in some embodiments, a query stroke may be input using a tablet device and/or stylus that provides data representing x and y components of the query stroke (i.e. trajectory data) and pressure (which may be mapped to a z component of the query stroke), but does not provide data representing tilt or twist components.

As illustrated in FIG. 5, the method may in some embodiments include obtaining estimated pose data, if any is available, for previously processed sample points, as in 530, and adding this information to the feature vector. In such embodiments (described in more detail below), pose data (e.g., data values representing pressure, tilt and/or twist) from library sample points determined to be the best neighbors of a pre-determined number of prior query sample points (e.g., in the sample windows prior to the current sample point) may be processed (e.g., averaged and/or otherwise filtered or combine) to generate pose data values for the feature vector. The feature vector may thus include a component value from each of the sample windows for the trajectory data (the x and y components), and for any of the pose components for which query stroke data (whether actual or estimated as described above) is available.

As illustrated in this example, the method may include comparing the resulting feature vector to feature vectors for sample points of reference strokes, as in 540. In some embodiments, only the trajectory data of the feature vector for the query stroke sample point (e.g., the ten x and y component values described in previous examples) may be compared with the corresponding data of the reference strokes (e.g., ten x and y component values for each of the sample points in the reference strokes) to identify the nearest neighbors of the query stroke sample point (e.g., if there is no pose data included in the feature vector for the query stroke sample point, or if such pose data is incomplete). In other embodiments, even if some or all of the data values for the pose components of the query stroke sample point are available, this pose data may not be used to identify the nearest neighbors of the query stroke sample point (e.g., if the user wishes the style of the synthesized stroke to be different from that of the input query stroke). In still other embodiments, any or all available pose data for the query stroke sample point may be compared with the corresponding data of the reference strokes (in addition to the trajectory data) to identify the nearest neighbors of the query stroke sample point.

As illustrated at 550 in FIG. 5, the method may include identifying the set of feature vectors for sample points of one or more reference strokes that are closest to the resulting feature vector, and adding those feature vectors to a nearest neighbor set for the given sample point. In some embodiments, a pre-determined number of nearest neighbors may be identified for each of the sample points. In various embodiments, this pre-determined number may be a fixed (e.g., a default) number that is applicable in all cases, or may be configurable (e.g., by a user or application) for a given stroke synthesis exercise or drawing session, for the user, for the application, or for synthesizing strokes using a particular stroke synthesis style.

Note that the operations illustrated in FIG. 5 may be applied to multiple sample points of the query stroke in order to construct a feature vector for each of those sample points and to determine a set of nearest neighbor features for each of those sample points. In some embodiments, these operations may be applied to query sample points as the stroke data necessary to construct the feature vector for each sample point (including, e.g., stroke data from one or more "future" sample points) becomes available. In other embodiments, the operations illustrated in FIG. 5 may not be performed for any samples of the query stroke until all of the stroke data for the query stroke is available. Note also that one or both of the operations illustrated as 510 and 520 may be applied to stroke data for samples of various reference strokes in order to generate feature vectors for those reference strokes.

Figure 6:
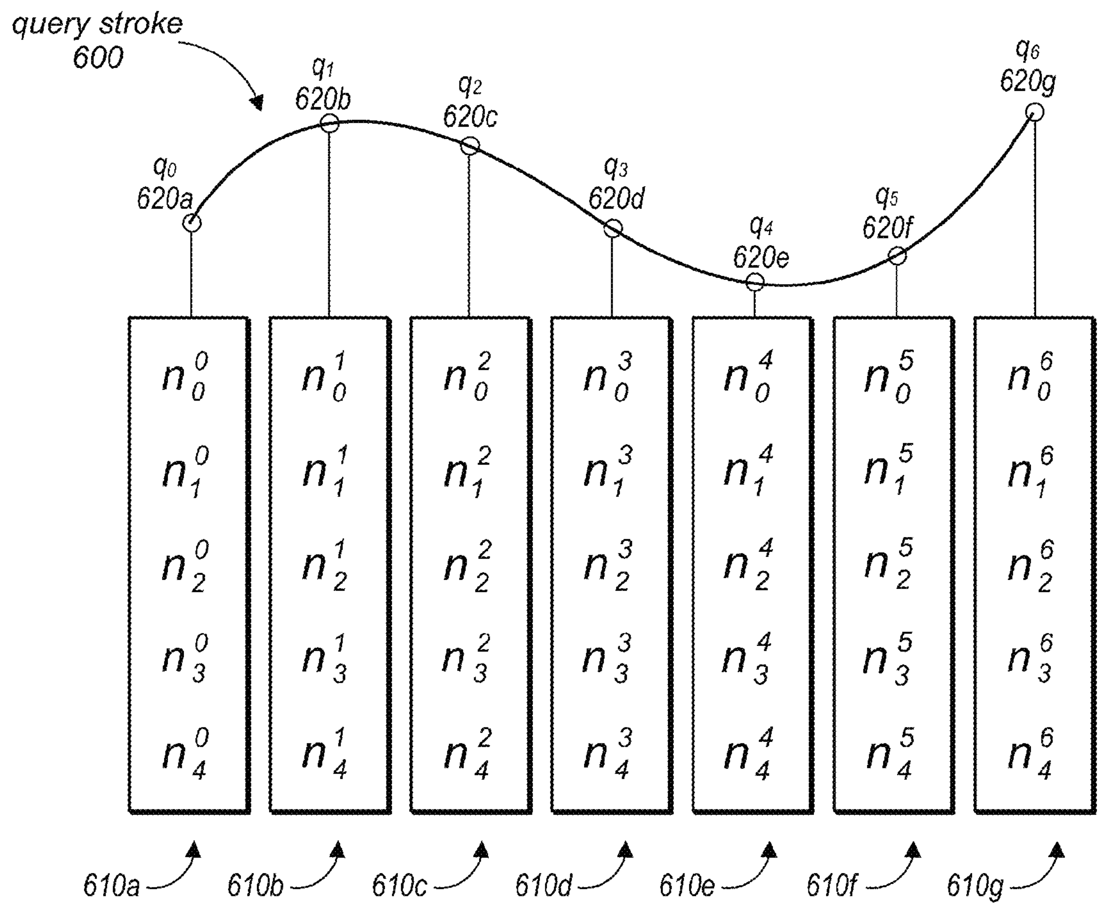
FIG. 6 illustrates the association of a set of nearest neighbor feature vectors from a library of reference strokes with each sample in a query stroke, according to one embodiment.

FIG. 6 illustrates the association of a set of nearest neighbor feature vectors from a library of reference strokes with each sample in a query stroke, according to one embodiment. In this example, each of the seven samples of a query stroke 600 (e.g., query sample points $q_0$-$q_6$, shown as 620*a*-620*g*) is associated with a respective nearest neighbor set 610 (shown as 610*a*-610*g*). In this example, each nearest neighbor set 610 includes the five feature vectors from the library of feature vectors. The values of these feature vectors most closely match the values in the feature vector constructed for the corresponding query sample (i.e. k=5, in this example). Note that since each of the feature vectors included in a given nearest neighbor set may be a feature vector constructed for a sample of a reference stroke in the library, these feature vectors may include higher fidelity stroke data than the query stroke (e.g., 6DOF data). However, since the feature vector for the query sample (in this example) includes only x and y components (i.e. trajectory data), only the x and y components of the library samples may be compared to the query sample to determine its nearest neighbors, even if the library samples include more data components (e.g., 6DOF data). In other embodiments, any or all pose data provided for the query stroke samples (e.g., actual pose data or estimated pose data included in the feature vector for the query sample) may also be compared to the pose data of the library samples when determining nearest and/or best neighbor features.

As previously noted, once a set of neighbor samples has been generated for each query stroke sample, a single (best) neighbor may be selected for each of the samples. Note that simply selecting the closest neighbor (e.g., the neighbor feature that most closely matches the query feature) at each sample may not always create high quality output strokes. For example, the selected poses for neighboring query samples may have very different poses, and may create discontinuities in the output stroke. Therefore, the system may in some embodiments be configured to find an optimal path through the set of neighbors by selecting the best neighbor at each sample while considering the choices made at the samples before and after the current sample. In other words, in some embodiments, the best neighbor selection may be treated as a graph problem in which each of the neighbors in the nearest neighbors sets is a node in the graph and the edges are the paths between each pair of neighbors in adjacent nearest neighbor sets. In such embodiments, the determination of the best neighbors may include finding the lowest cost path through the graph, i.e. find the sequence of nodes in the graph (one per column) such that the sum of the edge weights for the sequence of nodes has the lowest value (as compared to all other sequences of nodes in other paths across the graph).

For example, in some embodiments, the optimal selection of best neighbor features may be determined by making a graph among the neighbors and finding the minimum cost path through the graph using dynamic programming. In such embodiments, for each neighbor, $n_j^i$, edges are made to other neighbors $$n_0^{i-1}, \ldots, n_{k-1}^{i-1} \text{ and}$$

$$n_0^{i+1}, \ldots, n_{k-1}^{i+1}.$$

In some embodiments, the edge weights may be set to encourage the selection of neighbor vectors that correspond to continuous pieces of library strokes, rather than random samples. In some embodiments, edge weights may be set to encourage the selection of feature vectors corresponding to the beginning and ending samples of library strokes for the starting and ending samples of query strokes.

Figure 7:
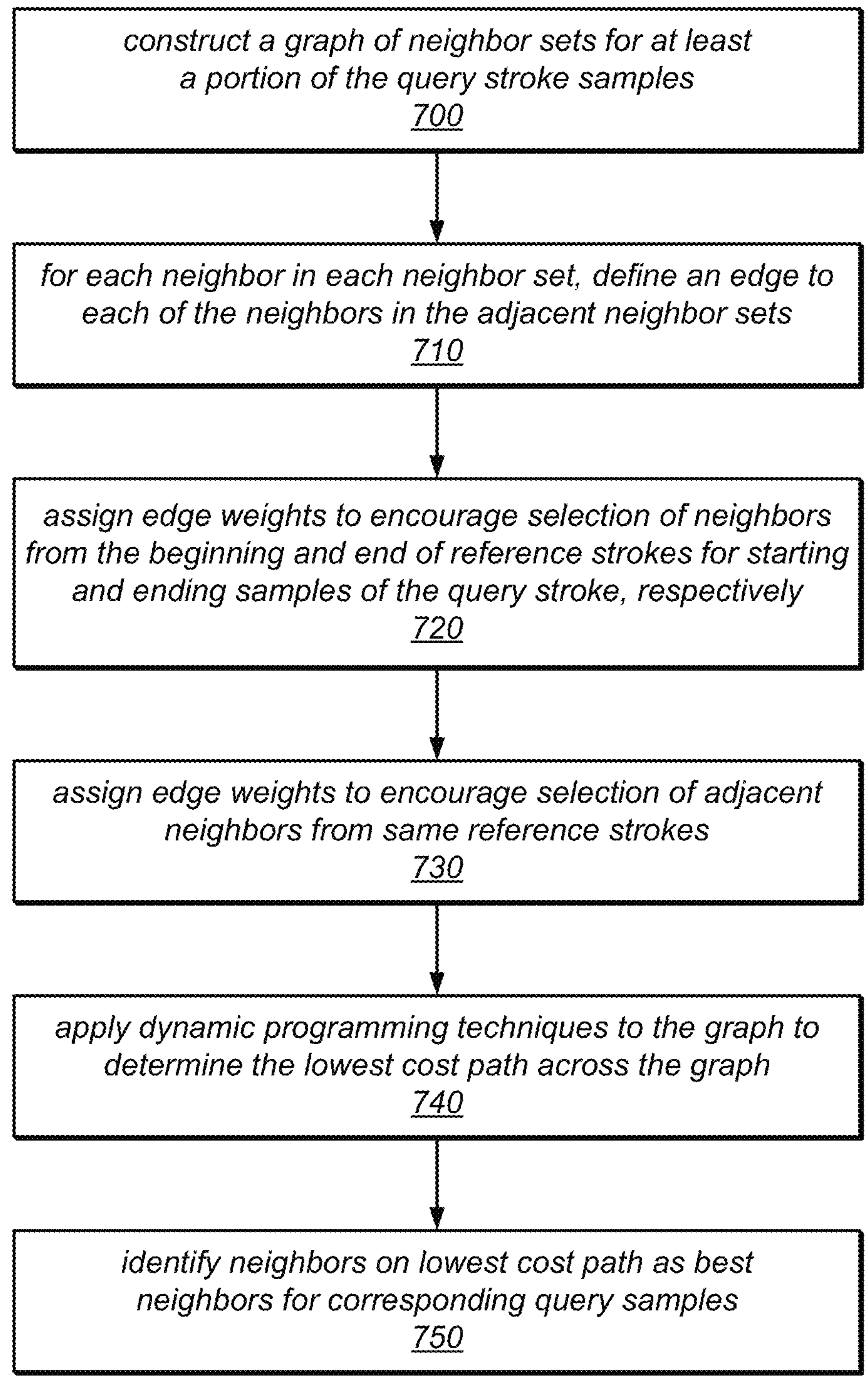
FIG. 7 is a flow diagram illustrating one embodiment of a method for determining the best neighbor for each of the samples of a query stroke.

One embodiment of a method for determining the best neighbor for each of the samples of a query stroke is illustrated by the flow diagram in FIG. 7. As illustrated in this example, the method may include constructing a graph of nearest neighbor sets for at least a portion of the query stroke samples, as in 700. For example, in some embodiments, the method may include constructing a graph of the nearest neighbor sets for all of the sample points of a query stroke, and processing the data in that graph to determine the best neighbor for each of the query stroke samples. In other embodiments, different graphs may be constructed for each of multiple processing windows that include only the data needed for determining the best neighbor for one or a subset of the query stroke samples. In such embodiments, the processing may take place in a moving processing window in real time, or in a moving processing window that lags real time slightly (e.g., in order to include query stroke data for one or more "future" sample points when determining the best neighbor for a given query stroke sample point).

As illustrated at 710 in FIG. 7, the method may include, for each neighbor in each neighbor set, defining an edge to each of the neighbors in the adjacent neighbor sets (e.g., on either side of the neighbor set for a given query stroke sample point). In some embodiments, edge weights may be assigned that may encourage the selection of neighbors from the beginning and end of reference strokes for the starting and ending samples of the query stroke, respectively. This is illustrated as 720 in FIG. 7. In some embodiments, the method may include assigning edge weights that encourage the selection of adjacent neighbors from the same reference stroke as best neighbors for adjacent points in the query stroke, as in 730. For example, if adjacent features of a single library curve (i.e. feature vectors for adjacent sample points on the same reference stroke or portion thereof) are included in adjacent nearest neighbor sets in FIG. 6, the edges between these features may be assigned a lower cost (or weighting) than edges between features from different library curves. Note that other types of heuristics may be applied to the edge weighting instead of (or in addition to) a weighting that favors adjacent features from the same library curve and/or a weighting that favors features from beginning and ending reference samples for beginning and ending query stroke samples, in different embodiments.

As illustrated in this example, the method may include applying dynamic programming techniques to the graph to determine the lowest cost path across the graph, as in 740. The neighbor features on the lowest cost path may then be identified as the best neighbors for the corresponding query samples, as in 750. As described herein, the pose data for the identified best neighbors may be assigned to the corresponding query stroke sample points in the output stroke, in some embodiments.

Figure 8A:
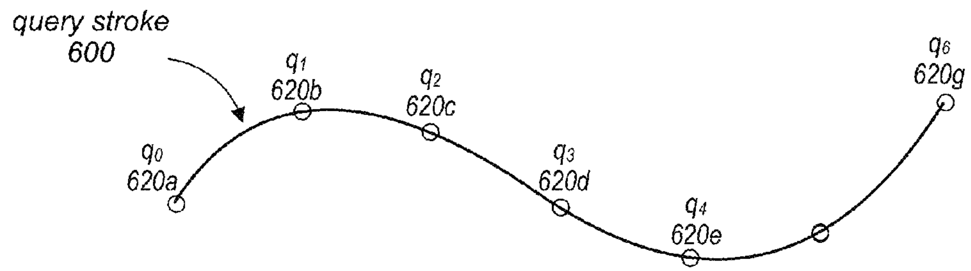
FIG. 8A illustrates a query stroke for which a lowest cost collection of nearest neighbors is to be determined, according to one embodiment.
Figure 8B:
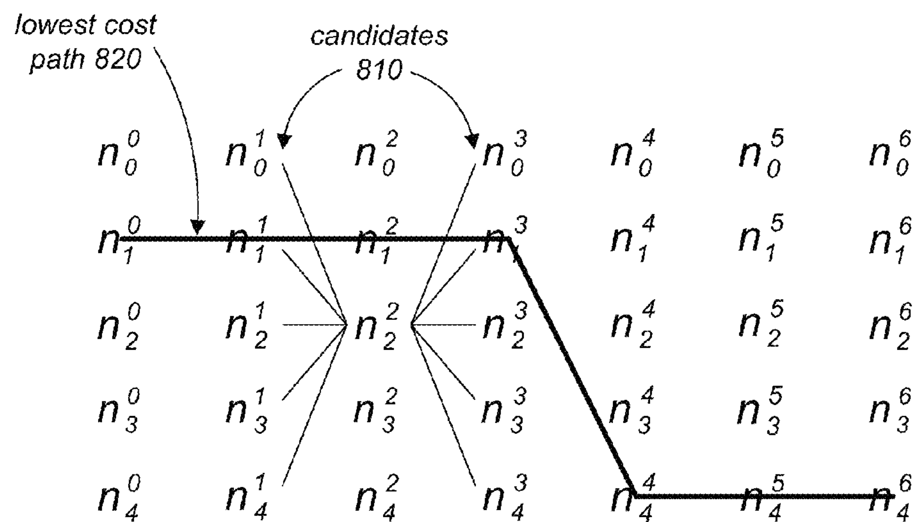
FIG. 8B illustrates the determination of a lowest cost collection of nearest neighbors for the samples in a query stroke based on feature vectors of one or more reference curves, according to one embodiment.
Figure 8C:
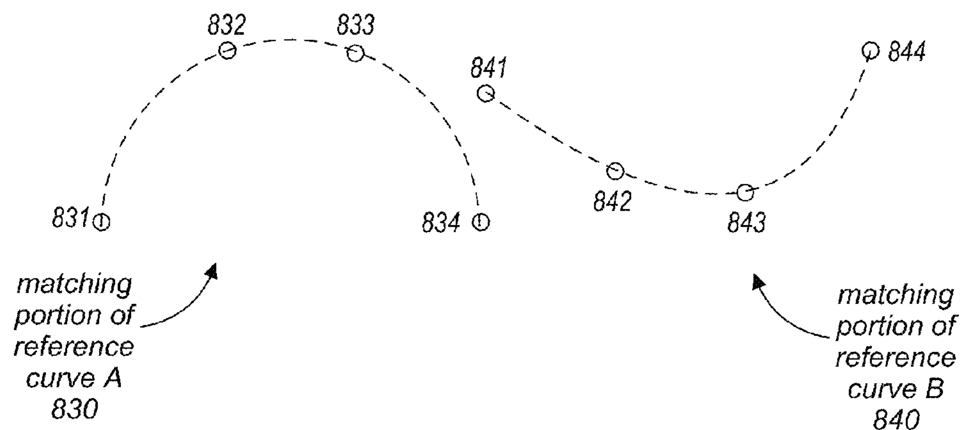
FIG. 8C illustrates two reference curves for which consecutive feature vectors are determined to be in a collection of lowest cost nearest neighbors for the samples in a query stroke, according to one embodiment.

As noted above, in some embodiments, dynamic programming techniques may be applied to determine a lowest cost path across a graph containing the nearest neighbor sets for each of the query samples. FIGS. 8A-8C illustrate the use of one such graph (shown as graph 800) in determining a lowest cost collection of nearest neighbors for the samples in query stroke 600, according to one embodiment. In this example, the best neighbors determined from among those in the nearest neighbor sets include feature vectors corresponding to collections of adjacent samples from two reference curves (illustrated in FIG. 8C). In this example, as in the example illustrated in FIG. 6, each query stroke sample of query stroke 600 (in FIG. 8A) is associated with a set of five nearest neighbors (i.e. five feature vectors for which at least a subset of the component values most closely match corresponding values in the feature vector constructed for the query stroke sample). Therefore, each neighbor in a nearest neighbor set may have one of five predecessors and one of five successors, and these predecessors and successors define the edges for a graph problem. For example, FIG. 8B illustrates that nearest neighbor $n_2^2$ (which is one of the nearest neighbors of query sample $q_2$, shown at 620*c* in FIG. 8A) may be preceded by one of five best neighbor candidates 810 in the preceding column and may be succeeded by one of five best neighbor candidates 810 in the succeeding column. As noted above, various dynamic programming techniques and various weighting heuristics may be applied to graph 800 and its data to determine the lowest cost path 820 through the graph.

In this example, nearest neighbors $n_1^0$ (corresponding to query sample $g_0$, shown as 620*a* in FIG. 8A), $n_1^1$ (corresponding to query sample $q_1$, shown as 620*b* in FIG. 8A), $n_1^2$ (corresponding to query sample $q_2$, shown as 620*c* in FIG. 8A), and $n_1^3$ (corresponding to query sample $q_3$, shown as 620*d* in FIG. 8A) all represent feature vectors of consecutive samples 831-834 in a portion of a reference curve A (shown as 830 in FIG. 8C). In this example, nearest neighbors $n_1^3$ (corresponding to query sample $q_3$, shown as 620*d* in FIG. 8A), $n_4^4$ (corresponding to query sample $q_4$, shown as 620*e* in FIG. 8A), $n_4^5$ (corresponding to query sample $q_5$, shown as 620*f* in FIG. 8A), and $n_4^6$ (corresponding to query sample $q_6$, shown as 620*g* in FIG. 8A) all represent feature vectors of consecutive samples 841-844 in a portion of a reference curve B (shown as 840 in FIG. 8C). In some embodiments, a weighting may be applied to the data in graph 800 that favors the selection of feature vectors corresponding to consecutive samples of the same reference curve. In this example, these two sequences of feature vectors from reference library curves A and B may have been selected for inclusion in lowest cost path 820 due, in part, to such a weighting. Note that in some cases, there may not be any consecutive sequences of feature vectors in any of the library curves that appear in the nearest neighbor sets of consecutive query stroke samples. Therefore, the determination of a lowest cost path through a nearest neighbor graph (such as graph 800 illustrated in FIG. 8B) may be dependent on other rules or heuristics that are applied to the weighting of reference curve samples. Note that in some cases, multiple portions of the same reference stroke may be matched to respective portions of a query stroke. For example, reference curve A and reference curve B of FIG. 8C may be different portions of the same reference curve. In other cases, portions of reference strokes that are matched to respective portions of a query stroke may come from different reference strokes in the same reference stroke library or in different reference stroke libraries.

In some embodiments, the high fidelity (e.g., 6DOF) stroke data for each of the reference curve samples whose feature vectors have been selected for inclusion in the lowest cost path (e.g., 820) may be included in a synthesized output stroke corresponding to query stroke 600. This output stroke may follow the original x, y trajectory of query stroke 600, but may include the pose information from these reference curve samples (whether or not the input query stroke data included any pose data).

In some cases, discontinuities may be apparent in the sequence of poses selected from best neighbor feature vectors, such as when only small pieces of reference strokes are able to be mapped to portions of the query stroke, with abrupt shifts at the transition points. In some embodiments, to reduce the visual impact of such discontinuities, cross-fading of the pose data (e.g., using averaging or another blending operation) may be performed over small windows between continuations of the reference strokes that contain the best neighbor samples on either side of the transition point.

Figure 9:
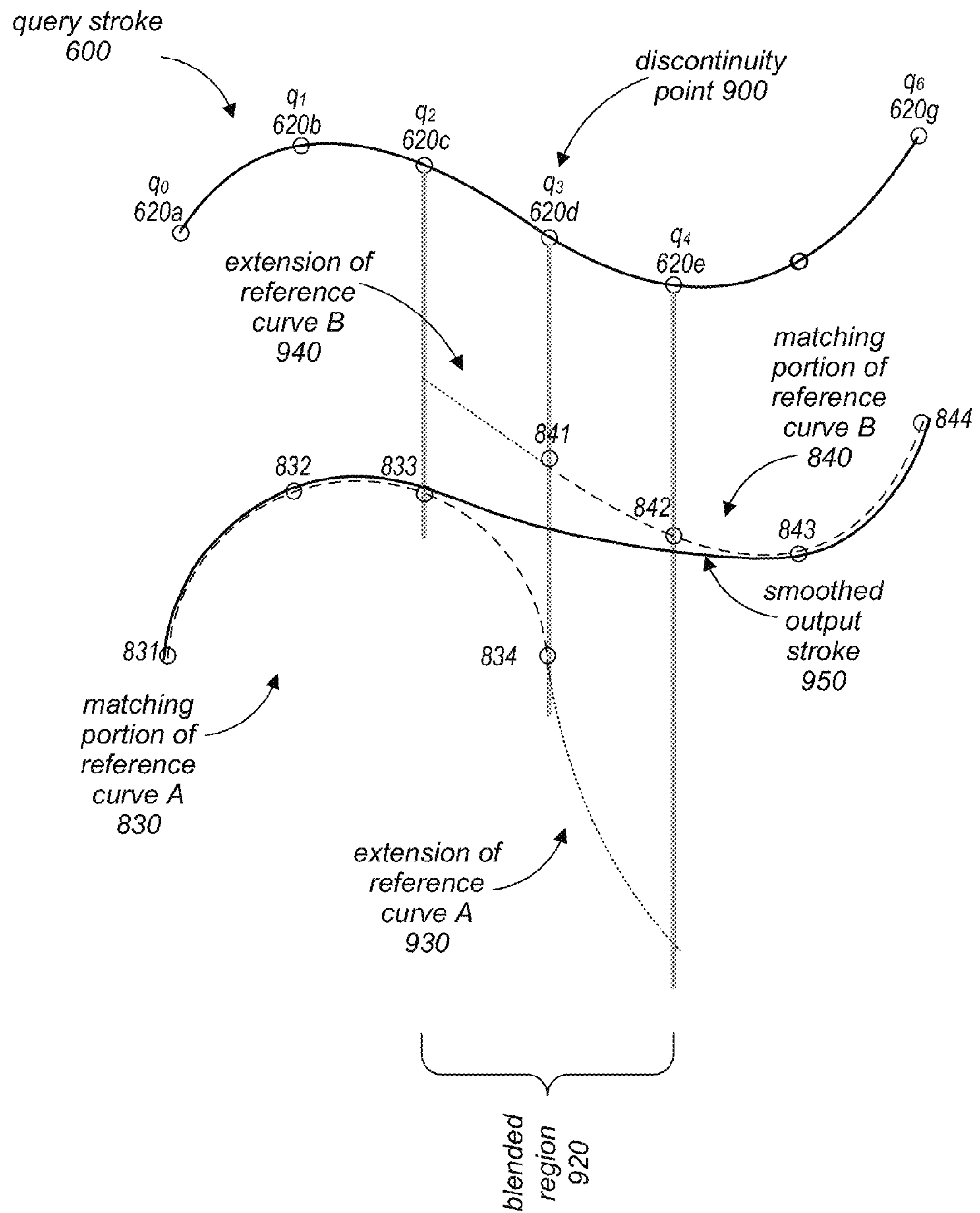
FIG. 9 illustrates smoothing between the poses of best neighbor features found in two reference curves, according to one embodiment.

FIG. 9 illustrates smoothing between the poses of best neighbor features found in two different reference curves, according to one embodiment. In this example, four samples (shown as 831-834) from reference curve A (shown as 830) and four samples (shown as 841-844) from reference curve B (shown as 840) were determined to be the best matches for different portions of query stroke 600. In FIG. 9, the thick, gray, vertical lines between 620*c* and 833, and between 620*e* and 842 indicate the correspondence between query stroke samples $q_2$ and $q_4$ (respectively) and the reference curve samples determined to have the best neighbor feature vectors for those query stroke samples.

A simple binary assignment of the pose data from these two curves to the output stroke may involve assigning the pose data from curve A to the first half of the output stroke (e.g., for sample points 831 to 834) and the pose data from curve B to the second half of the output stroke (e.g., for sample points 842 to 844). However, as illustrated by the thick, gray, vertical line passing through 620*d*, 841, and 834 in FIG. 9, this may result in a discontinuity (shown as discontinuity point 900, corresponding to query sample $q_3$) between the poses represented by the feature vectors for these two sets of reference samples (i.e. the sets of reference samples from library curves A and B), in this example. In some embodiments, rather than merely applying a simple binary assignment, the stroke synthesis engine may be configured to smooth out the discontinuity by extending the influence of each of the matched curve sections beyond the matched portion (e.g., by averaging the pose data of the two library curves to generate the pose data in the area surrounding the discontinuity. In the example illustrated in FIG. 9, the pose data values (e.g., pressure, tilt, and/or twist data values) for samples in extensions of reference curves A (830) and B (840), which are shown as 930 and 940 in the blended region 920, may be averaged to determine the pose data for output stroke 950.

In some embodiments, an image editing application may include a stroke synthesis engine and one or more libraries of reference strokes. For example, reference stroke data created by different artists and/or created in different styles (e.g., calligraphy, pointillist, impressionist, etc.) may be maintained in multiple libraries (e.g., separated by artist and/or style), or in a single stroke library, and may be included in, or accessible by an image editing application that includes a stroke synthesis engine. In some embodiments, if 6DOF input devices are not available for use with such an image editing application, a user may be able to pass lower dimension input data (e.g., 2DOF or 3DOF data for an input stroke that is provided by any of various cursor control devices) through the stroke synthesis engine, and the stroke synthesis engine may synthesize pose data to generate higher dimension and/or higher quality strokes. Similarly, if higher DOF devices are available for entering strokes, but the user wishes to stylize some or all of those input strokes, the user may opt to pass those input strokes though the synthesis engine to create strokes styled in the manner of various reference strokes. In general, passing input strokes through the synthesis engine may not change the trajectory of an input stroke (e.g., the synthesis engine may not be able to compensate for poor handwriting) but may be used to stylize the stroke so that it appears as if it included additional or different pose data (e.g., the synthesis engine may shade portions of the stroke to match a selected style).

Figure 10:
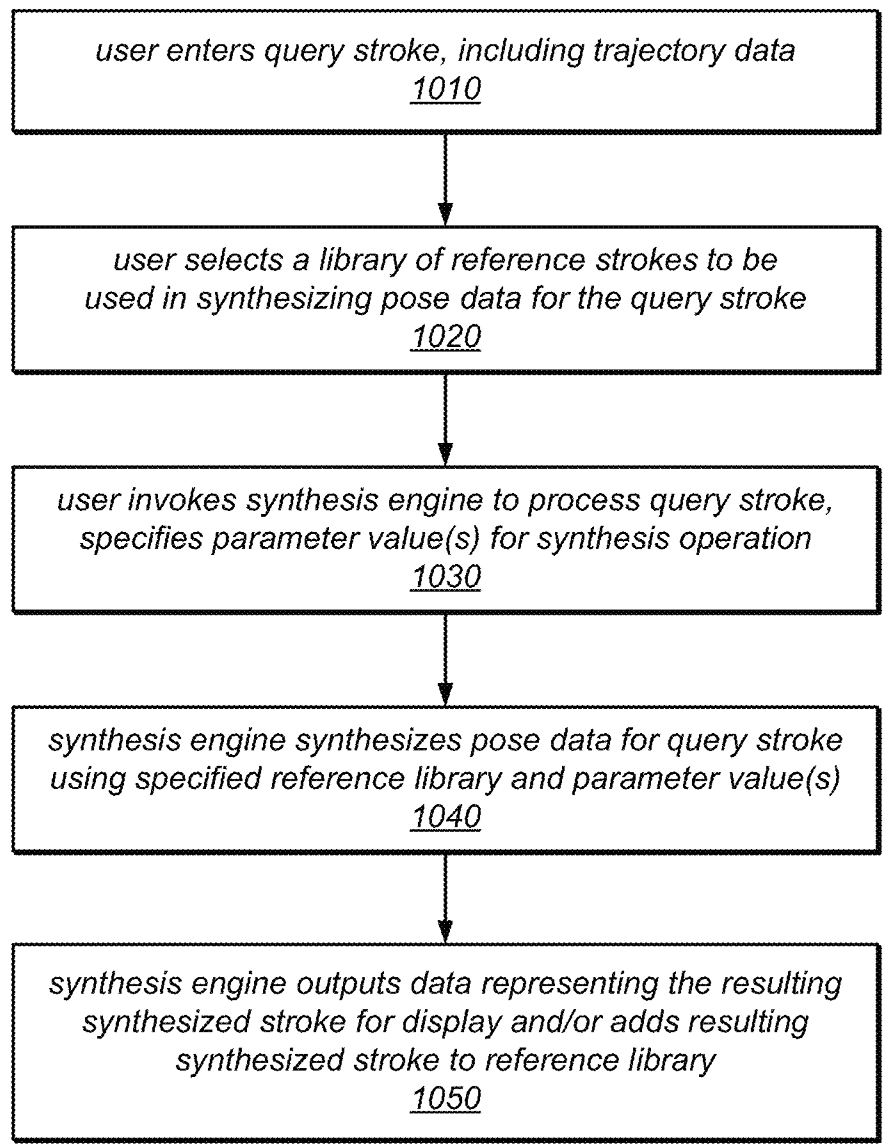
FIG. 10 is a flow diagram illustrating one embodiment of a method for applying the stroke synthesis techniques described herein.

One embodiment of a method for applying the stroke synthesis techniques described herein is illustrated by the flow diagram in FIG. 10. As illustrated at 1010 in this example, the method may include a user entering a query stroke (e.g., through a user interface of a stroke synthesis engine or other module of a computer system) for which the user desires to generate a higher fidelity, higher quality, and/or differently styled output stroke. The input data for the query stroke may include at least trajectory data (e.g., data representing x and y components at various points in the query stroke). In some embodiments, the input data for the query stroke may also include pose data (e.g., data representing some or all of pressure, tilt and/or twist components at various points in the query stroke). In some embodiments, the user may be able to select a library of reference strokes to be used in synthesizing pose data for the query stroke from among multiple reference stroke libraries supported or provided by the system, as in 1020. In other embodiments, one or more reference libraries may be used in synthesizing pose data for the query stroke by default or may be selected for use based on other parameters of the stroke synthesis exercise (e.g., based on a selected style, a selected artist, a selected genre, the application through which the synthesis engine is invoke, an identifier of the user, or other criteria).

As illustrated at 1030 in this example, the method may include the user invoking the synthesis engine to process the query stroke, and specifying one or more parameter value(s) for the stroke synthesis operation. For example, in some embodiments, the user may be able to specify input parameter values that enable the use of one or more filters on the raw data provided by the query stroke input, select the filter(s) to be used in constructing a feature vector for the query stroke, configure the number and/or widths of the sample windows to be used in constructing a feature vector for the query stroke, configure the number of neighbors to be included in the neighbor sets for each query stroke sample point, select one or more edge weighting algorithms to be used in nearest neighbor and/or best neighbor identification and selection, or otherwise configure the synthesis engine to perform a desired stroke synthesis operation. In other embodiments, the values of any or all of such parameters may be selected for use in synthesizing pose data for the query stroke by default or may be selected for use based on other parameters of the stroke synthesis exercise (e.g., based on a selected style, a selected artist, a selected genre, the application through which the synthesis engine is invoke, an identifier of the user, or other criteria).

In various embodiments, the method may include the synthesis engine synthesizing pose data for the query stroke using any or all of the methods described herein and dependent on the specified (or system-selected) reference library (or libraries) and the specified (or system-selected) parameter value(s), as in 1040. The synthesis engine may then output data representing the resulting synthesized stroke for display and/or may add the resulting synthesized stroke to one or more of the reference libraries, as in 1050. Note that in some embodiments, the synthesis engine may be configured to process a query stroke only after the entire stroke (e.g., an input representing a paintbrush stroke) has been entered. In other embodiments, some of which are described below, the synthesis engine may be configured to process portions of a query stroke at different times while the stroke is being entered (e.g., before the trajectory and/or pose data for the entire stroke is available) using default references libraries and input parameters or pre-selected reference libraries and input parameters.

FIGS. 11A-11E illustrate various reference strokes, query strokes, and output strokes, according to one embodiment. For example, FIG. 11A illustrates various reference strokes representing English script for which 6DOF stroke data has been captured, and FIG. 11B illustrates query strokes (again representing English script) for which only 2DOF information has been captured. FIG. 11C illustrates synthesized output strokes corresponding to the query strokes of FIG. 11B. In this example, the pose data for the output strokes illustrated in FIG. 11C has been synthesized dependent on the reference stroke data shown in FIG. 11A. Specifically, the output strokes illustrated in FIG. 11C follow the trajectories of the query strokes of FIG. 11B, but include pose data that is synthesized from the pose data of one or more samples of the reference strokes of FIG. 11A (e.g., based on their selection as best neighbors according to the trajectory data and/or pose data of the feature vectors for the reference strokes shown in FIG. 11A). Similarly, FIG. 11D illustrates query strokes for which only 2DOF information was captured, and FIG. 11E illustrates synthesized output strokes corresponding to the query strokes of FIG. 11D. In this example, the output strokes illustrated in FIG. 11E have been synthesized dependent on the reference stroke data shown in FIG. 11A (e.g., dependent on the trajectory data and/or pose data of the feature vectors for the reference strokes shown in FIG. 11A) and/or other reference strokes (not shown). Again, the output strokes shown in FIG. 11E follow the trajectories of the query strokes shown in FIG. 11D, but the pose data for the output strokes shown in FIG. 11E has been synthesized from the pose data of various samples of one or more reference strokes.

Note that the best neighbor selection process described above may in some embodiments rely on having the entire set of neighbor features for a complete query stroke available before an output stoke can be generated. In such embodiments, this process may not be appropriate for online (e.g., real-time) synthesis of output strokes from query strokes. However, several options for amending the process described above may support online stroke synthesis, and may facilitate the receipt and use of feedback during a stroke (i.e. before all of the query stroke data is available). Two such alternatives are described below.

In some alternate embodiments, a stroke synthesis engine may be configured to apply the dynamic programming approach described herein to a local sub-graph of nearest neighbor features, rather than to a full graph representing nearest neighbors for all of the samples in the entire query stroke. In such embodiments, some best neighbor features may be selected before the entire stroke is available. In some cases, this approach may result in sub-optimal output, but may still be desirable due to its faster performance. In such embodiments, dynamic programming may be applied to create poses for each query sample using a moving window (e.g., by lagging the query stroke by the width of a few samples in order to apply stroke data on either side of each query sample before stroke data for the entire stroke is available). In other words, in a windowed approach to best neighbor selection in which the determination of a best neighbor for a given query stroke sample lags the drawing of the query stroke by b samples, dynamic programming may be applied to a sub-graph of neighbor features that includes the neighbor feature sets for the previous a samples and the next b samples, but does not necessarily include the full graph.

In one example, a stroke synthesis engine may be configured to build only a portion of graph 800 at a time for query stroke 600, e.g., a portion of graph that includes only five columns at a time (corresponding to five nearest neighbor sets). In this example, a sub-graph that includes the data from nearest neighbor sets 610*a*-610*e* may be constructed when calculating the best neighbor feature for query sample $q_2$ (taking into account two nearest neighbor sets on each side of the nearest neighbor set for query sample $q_2$). After solving that portion of the graph (i.e. after determining the best neighbor feature for query sample $q_2$), another sub-graph may be constructed that includes the data from nearest neighbor sets 610*b*-610*f*. This second sub-graph may be used when calculating the best neighbor feature for query sample $q_3$. This approach may be applied repeatedly as a five-neighbor-set-wide window is moved one neighbor set to the right as each new query sample point becomes available and a corresponding feature vector and nearest neighbor feature set are determined for the new query sample point.

In other alternate embodiments, a stroke synthesis engine may be configured to apply a greedy best neighbor selection process instead. In such embodiments, a best neighbor sample may be selected as each new query sample becomes available, by simply choosing the minimum distance neighbor. In some such embodiments, the continuity of the neighbor samples may be improved by amending the feature vector used to determine the minimum distance neighbor to include the full, synthesized 6DOF data for each of the previous samples. In other words, using this approach, the pose data assigned to each of the previous query stroke samples (e.g., pressure, tilt and/or twist data such as that shown as estimated stroke data 420 in FIG. 4) may be included in the distance function along with trajectory data, as follows.

$$f_i = \langle s_{i-a}{}^{x}, s_{i-a}{}^{y}, s_{i-a}{}^{p}, s_{i-a}{}^{tx}, s_{i-a}{}^{ty} s_{i-a}{}^{\theta}, \ldots, s_i^{x}, s_i^{y}, \ldots, s_{i+b}{}^{x}, s_{i+y}{}^{b} \rangle$$

In an example in which five query sample points or windows are considered when determining the feature vector for a given query sample, the feature vector may include 18 component values: x and y components for each of the five sample points/windows (for a total of 10 values), plus 4 pose data components for each of the two sample points/windows prior to the current sample point/window (for a total of eight additional values). In various embodiments, the estimated pose data that is included in the feature vector may be raw pose data, or may be pose data that has been averaged, filtered, or otherwise aggregated (similar to manner in which trajectory data may be aggregated). As noted above, the additional pose component values may be included in the distance function to determine the nearest and best neighbors (which may then be dependent on having the most similar trajectory data and the most similar pose histories). For example, to determine estimated pose data for query sample $q_3$ of query stroke 600 (given that pose data has already been estimated for query samples $q_0$, $q_1$, and $q_2$), a feature vector would be constructed for q3 that includes trajectory data (based on past, present, and future x and y component values) and also pose data (based on the pose component data for one or more of the previous samples, $q_0$, $q_1$, and $q_2$). In this example, the nearest neighbors for query sample $q_3$ may then be selected based on having both similar trajectory data and similar pose histories. In this example, once the best neighbor has been selected for query sample $q_3$, its pose data may be assumed to be similar to the pose data for any subsequent query sample points, and so on.

In general, the stroke synthesis techniques described herein may in various embodiments be used to create high fidelity expressive brush strokes using a physical brush engine that supports these techniques, even on devices where full 6DOF input is not available, and/or in cases in which the pose data provided for an input stroke is not desirable to the user due to lack of skill or style considerations.

Example Implementations

Some embodiments may include a means for constructing feature vectors. For example, a feature vector construction module may receive reference stroke data or query stroke data, and may construct a series of feature vectors for samples of those strokes, as described herein. The feature vector construction module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving reference stroke data or query stroke data, and constructing a series of feature vectors for samples of those strokes, as described herein. Other embodiments of the feature vector construction module may be at least partially implemented by hardware circuitry and/or firmware stored, for example, in a non-volatile memory.

Some embodiments may include a means for finding the nearest neighbors of a query stroke feature. For example, a feature-matching module may compare feature vectors of query stroke samples to those of reference stroke samples to determine the nearest neighbors, as described herein. The feature-matching module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform comparing feature vectors of query stroke samples to those of reference stroke samples to determine the nearest neighbors, as described herein. Other embodiments of the feature-matching module may be at least partially implemented by hardware circuitry and/or firmware stored, for example, in a non-volatile memory.

Some embodiments may include a means for selecting the best neighbor features for a query sample from among a collection of nearest neighbor features. For example, a dynamic programming module may apply various weightings to the nearest neighbor features in a graph of nearest neighbor sets and may determine the lowest cost path across that graph, as described herein. The dynamic programming module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform applying various weightings to the nearest neighbor features in a graph of nearest neighbor sets and determining the lowest cost path across that graph, as described herein. Other embodiments of the dynamic programming module may be at least partially implemented by hardware circuitry and/or firmware stored, for example, in a non-volatile memory.

Some embodiments may include a means for smoothing the poses of selected best neighbors to create a high quality synthesized output stroke. For example, a pose-smoothing module may blend feature vector data (e.g., pose data) for selected best neighbors to produce a smooth output stroke, as described herein. The pose-smoothing module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform blending feature vector data (e.g., pose data) for selected best neighbors to produce a smooth output stroke, as described herein. Other embodiments of the pose-smoothing module may be at least partially implemented by hardware circuitry and/or firmware stored, for example, in a non-volatile memory.

Figure 12:
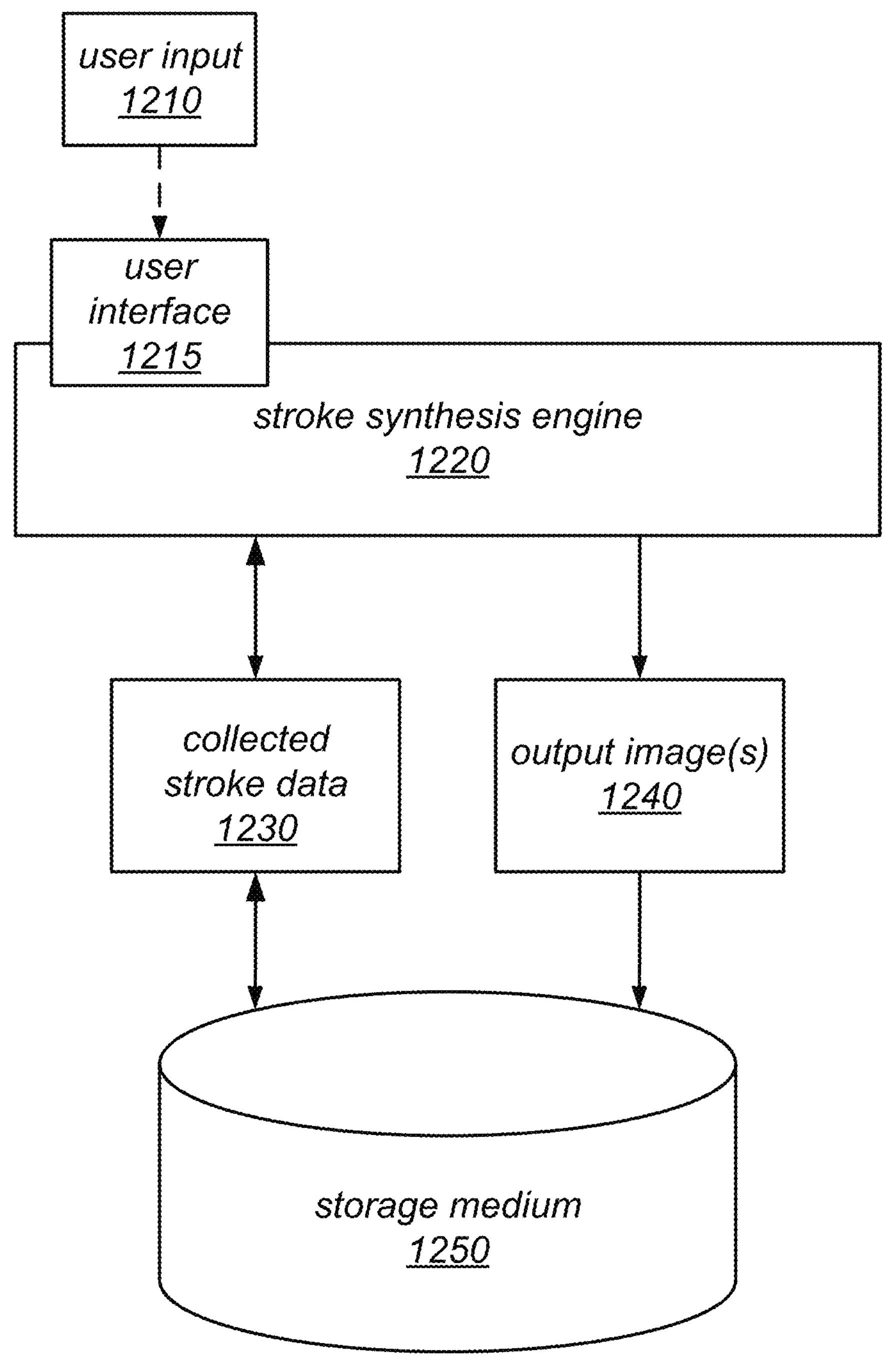
FIG. 12 illustrates a stroke synthesis engine that may implement synthesizing high fidelity stroke data for lower dimension input strokes, according to some embodiments.
Figure 13:
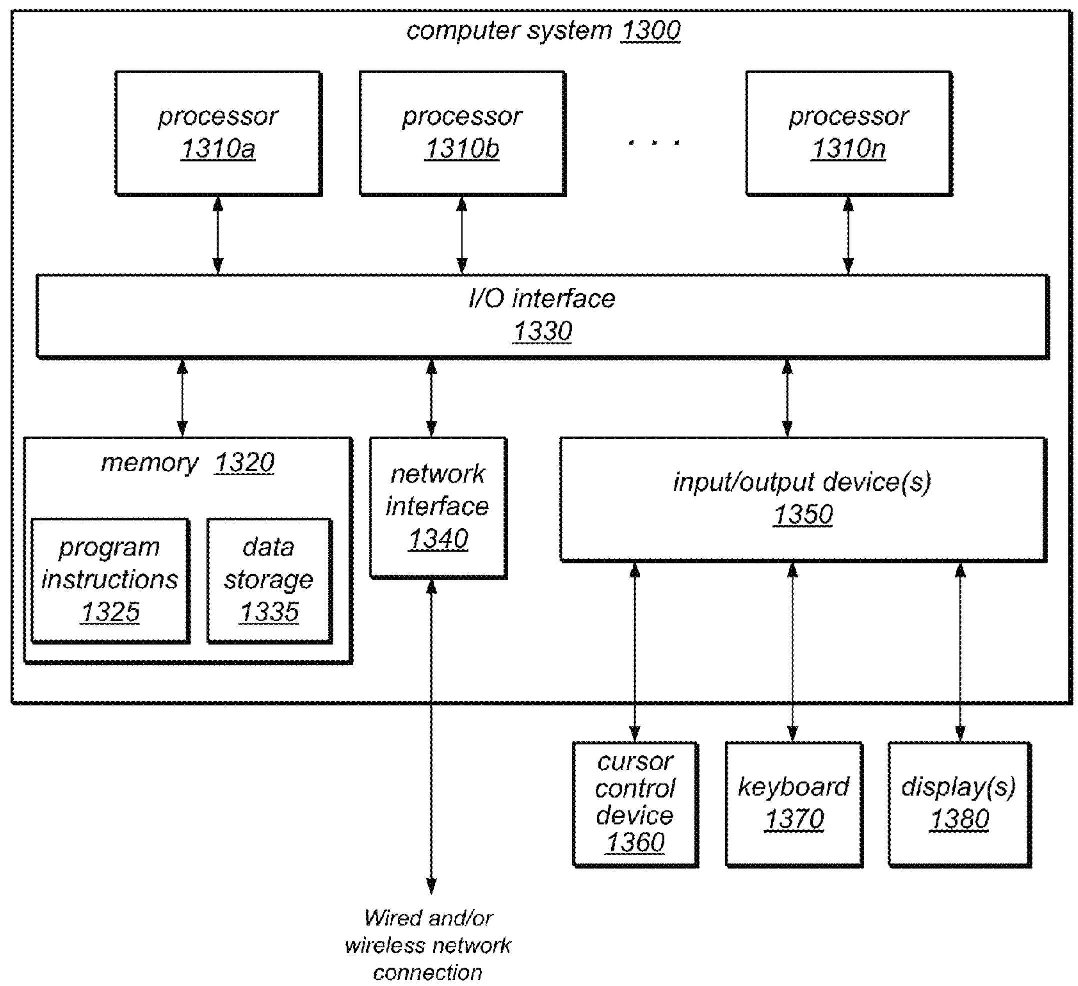
FIG. 13 illustrates an example computer system that is configured to implement synthesizing high fidelity stroke data for lower dimension input strokes, according to some embodiments.

FIG. 12 illustrates a stroke synthesis engine 1220 that may implement synthesizing high fidelity stroke data for lower dimension input strokes, according to various embodiments. In some embodiments, stroke synthesis engine 1220 may include a feature vector construction module, a feature-matching module, a dynamic programming module, and/or a pose-smoothing module, as described above. FIG. 13 illustrates an example computer system on which embodiments of stroke synthesis engine 1220 may be implemented. In this example, stroke synthesis engine 1220 may receive user input 1210 (e.g., reference stroke data, query stroke data, and/or input parameters for various stroke synthesis operations) via one or more user interfaces 1215 (which may include various tablet devices, stylus devices, and/or other input/output devices suitable for entering such information). The user input may include various types and amounts of stroke information (e.g., trajectory data and/or pose data) in any of multiple dimensions, and may include other input data associated with reference strokes, query strokes, and/or stroke synthesis operations. Stroke synthesis engine 1220 may generate as output one or more output images 1240, which may include one or more output strokes synthesized from query strokes dependent on various combinations of query stroke data and reference stroke data, using any or all of the methods described herein. Collected stroke data 1230 (e.g., reference stroke data) and/or output images 1240 may in various embodiments be stored in (or written to) a storage medium 1250, such as system memory, a disk drive, DVD, CD, etc., and subsequently accessed by stroke synthesis engine 1220 for use in subsequent operations to synthesize high fidelity stroke data for other query strokes. In some embodiments, output images 1240 may be displayed to users, e.g., via user interface 1215 (not shown).

Example System

Embodiments of a stroke synthesis engine and/or of the various modules thereof, as described herein, may be executed on one or more computer systems, which may interact with various other devices. FIG. 13 illustrates an example computer system that is configured to implement synthesizing high fidelity stroke data for lower dimension input strokes, according to some embodiments. In different embodiments, computer system 1300 may be any of various types of devices, including, but not limited to, a personal computer system, desktop computer, laptop, notebook, tablet device, slate device, netbook computer, mainframe computer system, handheld computer, workstation, network computer, camera, set top box, mobile device, consumer device, video game console, handheld video game device, application server, storage device, peripheral device (such as a switch, modem, or router), or in general any type of computing or electronic device.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In various embodiments, cursor control device 1360 may include one or more simple or advanced stylus devices (e.g., those that provide 2DOF to 6DOF stroke data), mouse devices, touchpads, and/or any other suitable cursor control devices. In various embodiments, display devices 1380 may include one or more simple or advanced tablet or slate devices (including, but not limited to, those described herein) and/or other types of devices that include a display capability and serve as input and/or output devices. In some embodiments, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

In some embodiments, at least one processor 1310 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the data processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1320 may be configured to store program instructions and/or data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a stroke synthesis engine (and/or modules thereof) are shown stored within system memory 1320 as program instructions 1325 and data storage 1335, respectively. In other embodiments, program instructions and/or data may be received, sent or stored upon different types of computer-accessible media or on similar media separate from system memory 1320 or computer system 1300. Generally speaking, a computer-accessible medium may include non-transitory storage media or memory media such as magnetic or optical media, e.g., disk or CD/DVD-ROM coupled to computer system 1300 via I/O interface 1330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1340.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. In addition, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, or between nodes of computer system 1300. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, cursor control devices, scanning devices, voice or optical recognition devices, or any other devices suitable for entering or retrieving data by one or more computer system 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1325, configured to implement embodiments of a stroke synthesis engine as described herein, and data storage 1335, comprising various data accessible by program instructions 1325. In one embodiment, program instructions 1325 may include software elements of embodiments of a stroke synthesis engine as illustrated in the above figures. Data storage 1335 may include data that may be used by a stroke synthesis engine, in various embodiments. In other embodiments, other or different software elements and data may be included in memory 1320.

Those skilled in the art will appreciate that computer system 1300 is merely illustrative and is not intended to limit the scope of a stroke synthesis engine as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. As previously noted, in different embodiments, computer system 1300 may be any of various types of devices, including, but not limited to, a personal computer system, desktop computer, laptop, notebook, tablet device, slate device, netbook computer, mainframe computer system, handheld computer, workstation, network computer, camera, set top box, mobile device, consumer device, video game console, handheld video game device, application server, storage device, peripheral device (such as a switch, modem, or router), or in general any type of computing or electronic device. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components described herein may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the techniques described herein may be practiced with other computer system configurations.

Various embodiments may further include receiving, sending or storing instructions and/or data implemented in accordance with the foregoing description upon a computer-accessible medium. Generally speaking, a computer-accessible medium may include non-transitory storage media or memory media such as magnetic or optical media, e.g., disk or DVD/CD-ROM, volatile or non-volatile media such as RAM (e.g. SDRAM, DDR, RDRAM, SRAM, etc.), ROM, etc. In other embodiments, a computer-accessible medium may include transmission media or signals such as electrical, electromagnetic, or digital signals, conveyed via a communication medium such as network and/or a wireless link.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:

performing by a computer:

receiving data representing a query stroke, wherein the data representing the query stroke comprises trajectory data indicating a trajectory of the query stroke with respect to two degrees of freedom;

accessing data representing a plurality of reference strokes, wherein the data representing each of the plurality of reference strokes comprises trajectory data indicating a trajectory of the reference stroke with respect to the two degrees of freedom and pose data for the reference stroke with respect to one or more other degrees of freedom;

creating a sequence of synthesized poses that follows the trajectory of the query stroke, wherein pose data for the synthesized poses is dependent, at least in part, on the data representing the plurality of reference strokes, the data representing the query stroke comprising data for fewer degrees of freedom than the data representing the reference strokes and fewer degrees of freedom than the data representing the sequence of synthesized poses; and outputting data representing the sequence of synthesized poses.

2. The method of claim 1, wherein said accessing the data representing the plurality of reference strokes comprises accessing data that was generated by one or more skilled artists and that is stored in one or more reference stroke libraries.

3. The method of claim 1, wherein said creating the sequence of synthesized poses comprises:

constructing a feature vector for each of a plurality of samples of the query stroke, wherein the feature vector for each of the plurality of samples comprises trajectory data components that are dependent on trajectory data for one or more neighboring samples of the query stroke;

comparing the feature vector for each of the plurality of samples of the query stroke to feature vectors for a plurality of samples of one or more reference strokes; and identifying a best neighbor feature vector for each of the plurality of samples of the query stroke from among the feature vectors for the plurality of samples of the one or more reference strokes.

4. The method of claim 3, wherein:

the best neighbor feature vector for each of the plurality of samples of the query stroke comprises the pose data for a corresponding sample of one of the one or more reference strokes; and said creating the sequence of synthesized poses further comprises assigning the pose data of the best neighbor feature vector for each of the plurality of samples of the query stroke as pose data for the sample of the query stroke.

5. The method of claim 4, wherein said creating the sequence of synthesized poses further comprises:

performing a smoothing operation between the pose data assigned to one or more pairs of adjacent query samples.

6. The method of claim 3, wherein said creating the sequence of synthesized poses further comprises:

identifying a collection of nearest neighbor feature vectors for each of the plurality of samples of the query stroke, wherein the collection of nearest neighbor feature vectors for each sample of the query stroke comprises two or more feature vectors for respective samples of one or more reference strokes that are most similar to the feature vector constructed for the sample of the query stroke; and wherein said identifying a best neighbor feature vector for each of the plurality of samples of the query stroke comprises selecting one of the nearest neighbor feature vectors from each of the collections of nearest neighbor feature vectors.

7. The method of claim 6, wherein said selecting one of the nearest neighbor feature vectors from each of the collections of nearest neighbor feature vectors comprises applying dynamic programming to the collections of nearest neighbor feature vectors to determine the lowest cost sequence of nearest neighbor feature vectors.

8. The method of claim 6, wherein said selecting one of the nearest neighbor feature vectors from each of the collections of nearest neighbor feature vectors comprises applying a weighting to the collections of nearest neighbor feature vectors that encourages the selection, for adjacent samples of the query stroke, of nearest neighbor feature vectors for adjacent samples of a same reference stroke.

9. A system, comprising:

an input device;

a display device; and a computer device that is configured to:

receive data representing a query stroke, wherein the data representing the query stroke comprises trajectory data indicating a trajectory of the query stroke with respect to two degrees of freedom;

access data representing a plurality of reference strokes, wherein the data representing each of the plurality of reference strokes comprises trajectory data indicating a trajectory of the reference stroke with respect to the two degrees of freedom and pose data for the reference stroke with respect to one or more other degrees of freedom;

create a sequence of synthesized poses that follows the trajectory of the query stroke, wherein pose data for the synthesized poses is dependent, at least in part, on the data representing the plurality of reference strokes, the data representing the query stroke comprising data for fewer degrees of freedom than the data representing the reference strokes and fewer degrees of freedom than the data representing the sequence of synthesized poses; and output data representing the sequence of synthesized poses to the display device.

10. The system of claim 9, wherein to said create the sequence of synthesized poses, the computer device is configured to:

construct a feature vector for each of a plurality of samples of the query stroke, wherein the feature vector for each of the plurality of samples comprises trajectory data components that are dependent on trajectory data for one or more neighboring samples of the query stroke;

compare the feature vector for each of the plurality of samples of the query stroke to feature vectors for a plurality of samples of one or more reference strokes; and identify a best neighbor feature vector for each of the plurality of samples of the query stroke from among the feature vectors for the plurality of samples of the one or more reference strokes.

11. The system of claim 10, wherein:

the best neighbor feature vector for each of the plurality of samples of the query stroke comprises the pose data for a corresponding sample of one of the one or more reference strokes; and to said create the sequence of synthesized poses, the computer device is further configured to assign the pose data of the best neighbor feature vector for each of the plurality of samples of the query stroke as pose data for the sample of the query stroke.

12. The system of claim 11, wherein to said create the sequence of synthesized poses, the computer device is further configured to perform a smoothing operation between the pose data assigned to one or more pairs of adjacent query samples.

13. The system of claim 10, wherein to said create the sequence of synthesized poses, the computer device is further configured to:

identify a collection of nearest neighbor feature vectors for each of the plurality of samples of the query stroke, wherein the collection of nearest neighbor feature vectors for each sample of the query stroke comprises two or more feature vectors for respective samples of one or more reference strokes that are most similar to the feature vector constructed for the sample of the query stroke; and wherein to said identify a best neighbor feature vector for each of the plurality of samples of the query stroke, one of the nearest neighbor feature vectors are selected from each of the collections of nearest neighbor feature vectors.

14. The system of claim 13, wherein to said select one of the nearest neighbor feature vectors from each of the collections of nearest neighbor feature vectors, the computer device is configured to:

apply a weighting to the collections of nearest neighbor feature vectors that encourages the selection, for adjacent samples of the query stroke, of nearest neighbor feature vectors for adjacent samples of a same reference stroke; and apply dynamic programming to the collections of weighted nearest neighbor feature vectors to determine the lowest cost sequence of nearest neighbor feature vectors.

15. A non-transitory, computer-readable storage medium storing program instructions that when executed on one or more computers cause the one or more computers to perform:

receiving data representing a query stroke, wherein the data representing the query stroke comprises trajectory data indicating a trajectory of the query stroke with respect to two degrees of freedom;

accessing data representing a plurality of reference strokes, wherein the data representing each of the plurality of reference strokes comprises trajectory data indicating a trajectory of the reference stroke with respect to the two degrees of freedom and pose data for the reference stroke with respect to one or more other degrees of freedom;

creating a sequence of synthesized poses that follows the trajectory of the query stroke, wherein pose data for the synthesized poses is dependent, at least in part, on the data representing the plurality of reference strokes, the data representing the query stroke comprising data for fewer degrees of freedom than the data representing the reference strokes and fewer degrees of freedom than the data representing the sequence of synthesized poses; and outputting data representing the sequence of synthesized poses.

16. The storage medium of claim 15, wherein said creating the sequence of synthesized poses comprises:

constructing a feature vector for each of a plurality of samples of the query stroke, wherein the feature vector for each of the plurality of samples comprises trajectory data components that are dependent on trajectory data for one or more neighboring samples of the query stroke;

comparing the feature vector for each of the plurality of samples of the query stroke to feature vectors for a plurality of samples of one or more reference strokes;

identifying a best neighbor feature vector for each of the plurality of samples of the query stroke from among the feature vectors for the plurality of samples of the one or more reference strokes, wherein the best neighbor feature vector for each of the plurality of samples of the query stroke comprises the pose data for a corresponding sample of one of the one or more reference strokes; and assigning the pose data of the best neighbor feature vector for each of the plurality of samples of the query stroke as pose data for the sample of the query stroke.

17. The storage medium of claim 16, wherein said creating the sequence of synthesized poses further comprises:

performing a smoothing operation between the pose data assigned to one or more pairs of adjacent query samples.

18. The storage medium of claim 16, wherein said creating the sequence of synthesized poses further comprises:

identifying a collection of nearest neighbor feature vectors for each of the plurality of samples of the query stroke, wherein the collection of nearest neighbor feature vectors for each sample of the query stroke comprises two or more feature vectors for respective samples of one or more reference strokes that are most similar to the feature vector constructed for the sample of the query stroke; and wherein said identifying a best neighbor feature vector for each of the plurality of samples of the query stroke comprises selecting one of the nearest neighbor feature vectors from each of the collections of nearest neighbor feature vectors.

19. The storage medium of claim 18, wherein said selecting one of the nearest neighbor feature vectors from each of the collections of nearest neighbor feature vectors comprises:

applying a weighting to the collections of nearest neighbor feature vectors that encourages the selection, for adjacent samples of the query stroke, of nearest neighbor feature vectors for adjacent samples of a same reference stroke; and applying dynamic programming to the collections of weighted nearest neighbor feature vectors to determine the lowest cost sequence of nearest neighbor feature vectors.

20. The storage medium of claim 15, wherein said accessing the data representing the plurality of reference strokes comprises accessing data that was generated by one or more skilled artists and that is stored in one or more reference stroke libraries.

* * * * *